United States Patent
Minato

(10) Patent No.: US 7,702,240 B2
(45) Date of Patent: Apr. 20, 2010

(54) OPTICAL MULTIPLEX COMMUNICATION SYSTEM AND DELAY QUANTITY ADJUSTMENT METHOD

(75) Inventor: Naoki Minato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 472 days.

(21) Appl. No.: 11/790,769

(22) Filed: Apr. 27, 2007

(65) Prior Publication Data
US 2007/0286603 A1 Dec. 13, 2007

(30) Foreign Application Priority Data
May 23, 2006 (JP) ............... 2006-142936

(51) Int. Cl.
*H04J 14/08* (2006.01)
(52) U.S. Cl. .................. 398/74; 398/75; 398/76; 398/77; 398/102; 398/161; 398/185; 398/190
(58) Field of Classification Search ............ 398/74–77, 398/102, 161, 185, 190
See application file for complete search history.

(56) References Cited

U.S. PATENT DOCUMENTS

| | | | | |
|---|---|---|---|---|
| 7,174,103 | B2* | 2/2007 | Nishiki et al. | 398/77 |
| 7,224,902 | B2* | 5/2007 | Nishiki | 398/87 |
| 2004/0136646 | A1* | 7/2004 | Shahar et al. | 385/24 |
| 2005/0089328 | A1* | 4/2005 | Nishiki et al. | 398/77 |
| 2006/0115272 | A1* | 6/2006 | Minato et al. | 398/77 |
| 2006/0193633 | A1* | 8/2006 | Minato et al. | 398/77 |
| 2006/0269286 | A1* | 11/2006 | Sasaki | 398/77 |

(Continued)

FOREIGN PATENT DOCUMENTS

JP  2000-209186  7/2000

(Continued)

OTHER PUBLICATIONS

S Galli, R. Menendez, P. Toliver, T. Banwell, J. Jackel, J. Young, S. Etemad, "DWDM-Compatible Spectrally Phase Encoded Optical CDMA" Globecom 2004.*

(Continued)

*Primary Examiner*—Ken N Vanderpuye
*Assistant Examiner*—Danny W Leung
(74) *Attorney, Agent, or Firm*—Rabin & Berdo, P.C.

(57) ABSTRACT

The present invention is an optical multiplex communication system in which an optical wavelength division channel and an optical code division channel can coexist, wherein a WDM channel section 86 has a wavelength demultiplexer 36 and WDM channels W1 to W4. An optical pulse string 83-3 is demultiplexed by the wavelength demultiplexer 36, and for channel W1, an optical pulse 37 with wavelength $\lambda_1$ is input to an intensity modulator 114 and converted into an optical pulse signal of channel W1, and is output as a wavelength division optical pulse signal 115, where transmission information of channel W1 is reflected. An optical delay unit 116 provides a required time delay to a wavelength division optical pulse signal, so as to not match a position of an optical pulse constituting a wavelength division optical pulse signal 117 on a time base, and a position of a chip pulse constituting an encoded optical pulse signal which comes from an OCDM channel, and has a same wavelength as this optical pulse, on a time base.

11 Claims, 12 Drawing Sheets

U.S. PATENT DOCUMENTS

| | | | |
|---|---|---|---|
| 2007/0077070 A1* | 4/2007 | Iwamura | 398/78 |
| 2007/0122153 A1* | 5/2007 | Tamai | 398/77 |
| 2007/0286603 A1* | 12/2007 | Minato | 398/53 |
| 2009/0142052 A1* | 6/2009 | Pegg et al. | 398/26 |

FOREIGN PATENT DOCUMENTS

| | | |
|---|---|---|
| JP | 2003-248251 | 9/2003 |

OTHER PUBLICATIONS

S. Galli, R. Menendez, P. Toliver, T. Banwell, J. Jackel, J. Young, S. Etemad, "Experimental Results on the Simultaneous Transmission of Two 2.5 Gbps Optical-CDMA Channels and a 10 Gbps OOK Channel Within the Same WDM Window" IEEE OFC'05.*

Kebin Li, Wei Cong, V. J. Hernandez, Ryan P. Scott, Jing Cao, Yixue Du, J. P. Heritage, Brian H. Kolner, S. J. B. Yoo, "10 Gbit/s optical CDMA encoder-decoder BER performance using HNLF thresholder", 2004.*

S. Galli, et al., "Novel Results on the Coexistence of Spectrally Phase-Encoded OCDMA and DWDM", IEEE ICC'05, Seoul, Korea, May 16-20, 2005.*

V. J. Hernandez, Wei Cong, R. P. Scott, Kebin Li, J. P. Heritage, B. H. Kolner, S. J. Ben Yoo, "A Synchronous O-CDMA System Incorporating UNI-based Time Gating" 2005.*

"Error-free transmission of 2-channel x 2.5 Gbit/s time-spread/wavelength-hop OCDM using fibre Bragg grating with supercontinuum light source", N. Wada, et al., ECOC' 99, Sep. 26-30, 1999.

"Demonstration of a Four-Channel WDM/OCDMA System Using 255-Chip 320-Gchip/s Quarternary Phase Coding Gratings" P.C. Teh, et al., IEEE Photonics Technology Letters, vol. 14, No. 2, Feb. 2002, pp. 227 to 229.

"An incoherent wavelength hopping/time-spreading code-division multiple access system", S. Yegnanarayaman, et al., ECOC' 99, Sep. 26-30, 1999.

"Transmission design and evaluation of data rate enhanced time-spread/wavelength-hopping optical code division multiplexing using fiber-Bragg-grating" Naoki Minato et al., Technical Report IEICE, CS 2003-17, OCS2003-24, PS20030-24, PS2003-23, May 2003, pp. 49 to 54.

"Optical Code Division Multiplexing (OCDM) and Its Applications to Photonic Networks" K. Kitayama et al., IEICE Trans. Fundamentals, vol. E82-A, No. 12, Dec. 1999, pp. 2616 to 2626.

"Nonlinear Fiber Optics", Govinda P. Agrawal, Ver. 2, Academic Press, published 1989.

"Reduction of Interchannel Interference Noise in a Two-Channel Grating-Based OCDMA System Using a Nonlinear Optical Loop Mirror", Ju Han Lee, et al., IEEE, Photonics Technology Letters, vol. 13, No. 5, May 2001, pp. 529 to 531.

* cited by examiner

US 7,702,240 B2

OPTICAL MULTIPLEX COMMUNICATION SYSTEM AND DELAY QUANTITY ADJUSTMENT METHOD

BACKGROUND OF THE INVENTION

1. Field of the Invention

The present invention relates to an optical multiplex communication system in which Wavelength Division Multiplexing (WDM) transmission/reception and Optical Code Division Multiplexing (OCDM) transmission reception can coexist.

2. Description of Related Art

In order to increase speed or increase capacity of optical fiber communication, optical multiplex communication technology for transmitting a plurality of channels of optical pulse signals simultaneously on one optical fiber transmission line has been studied. As a means of optical multiplex communication, WDM, to identify a channel by the wavelength of optical pulses constituting an optical pulse signal, and OCDM, to identify a channel by pattern matching of encoded optical pulse signals, have been researched.

First, the configuration and function of an example of an OCDM device (e.g. see N. Wada, et al: "Error-free transmission of 2-channel×2.5 Gbit/s time-spread/wavelength-hop OCDM using fibre Bragg grating with supercontinuum light source", ECOC' 99, 26-30 Sep. 1999, and Japanese Patent Application Laid-Open No. 2000-209186) will be described with reference to FIG. 1 and FIG. 2A to G. FIG. 1 is a block diagram depicting the time-spread/wavelength-hop OCDM system. FIG. 2A to G are diagrams depicting the time waveform of signals at each location of the time-spread/wavelength-hop OCDM system.

This OCDM system is comprised of a transmission section 40 and a receive section 60 connected to a transmission line 52. The transmission line 52 is an optical fiber. FIG. 1 shows a device assuming 2 channel transmission/reception to prevent explanation from becoming unnecessarily complicated. It is obvious from the description herein below that an OCDM system which allows 3 or more channels of transmission/reception can be implemented in the same way merely by increasing the number of channels.

The transmission section 40 has an encoder 44 of the first channel, and encoder 48 of the second channel and an optical multiplexer 50. The encoder 44 of the first channel encodes an optical pulse signal 43 of the first channel with a code provided as code 1, and outputs it as the encoded optical pulse signal 45 of the first channel. The optical pulse signal 43 of the first channel is output from a signal generator 42 of the first channel. The encoder 48 of the second channel also encodes an optical pulse signal 47 of the second channel with a code provided as code 2, and outputs it as an encoded optical pulse signal 49 of the second channel. The optical pulse signal 47 of the second channel is output from a signal generator 46 of the second channel.

FIGS. 2A and B are diagrams depicting the time waveforms of the optical pulse signals of the first and second channels respectively, and one optical pulse constituting each optical pulse signal is shown respectively as a representative example. An optical pulse constituting the optical pulse signal of the first and second channels includes optical components of different wavelengths $\lambda_1$, $\lambda_2$ and $\lambda_3$. To illustrate this, a rectangle enclosing number 1, 2 or 3, which represents wavelength $\lambda_1$, $\lambda_2$ or $\lambda_3$, is stacked on a same point in time. Here an optical pulse signal, comprised of three different types of wavelengths, will be described. However, the number of types of wavelengths included in an optical pulse is not limited to three, but the same description will be applied to the case when two or four or more types of wavelengths are included.

An optical pulse including optical components with different wavelengths $\lambda_1$, $\lambda_2$ and $\lambda_3$ means that if this optical pulse is separated and arrayed on the wavelength base, this optical pulse is dispersed into optical pulses of which the central wavelengths are $\lambda_1$, $\lambda_2$ and $\lambda_3$. An optical pulse comprised of a single wavelength optical component, which is acquired by dividing the wavelength of an optical pulse including a plurality of optical components, may be called a "chip pulse" herein below.

Hereafter an optical pulse including different wavelength components is shown by stacking up a rectangle enclosing an identification number to indicate the wavelength of that wavelength component on a same point in time. In FIG. 2A to G optical pulses of the second channel are shaded with hatching in order to identify an optical pulse of the first channel and an optical pulse of the second channel.

FIGS. 2C and D show an encoded optical pulse signal 45 of the first channel and an encoded optical pulse signal 49 of the second channel on a time base. As FIG. 2C shows, in the case of the encoded optical pulse signal 45 of the first channel, for example, the optical pulse constituting the optical pulse signal 43 of the first channel is dispersed, by the encoder 44, into optical pulses (chip pulses) having central wavelengths $\lambda_1$, $\lambda_2$ and $\lambda_3$, which are time-spread on the time base. As FIG. 2D shows, the encoded optical pulse signal 49 of the second channel is also dispersed into chip pulses and are time-spread on the time base. The code being set in the encoder of the first channel (code 1) and the code being set in the encoder of the second channel (code 2) are different codes, so the positions of the respective chip pulses of the encoded optical pulse signals of the first and second channels arrayed on the time base are different, as shown in FIGS. 2C and D.

In this way, the encoding performed by the transmission section 40 of the device shown in FIG. 1 is a method of time-spreading the optical pulse on the time base, and encoding by dispersing it into the optical pulses (chip pulses) having central wavelengths $\lambda_1$, $\lambda_2$ and $\lambda_3$ constituting the optical pulse, so this is called "encoding by time-spread/wavelength-hop codes". In other words, encoding by time-spread/wavelength-hop encoding is performed for the optical pulse signals 43 and 47 of the first and second channels by the encoder 44 of the first channel and the encoder 48 of the second channel respectively.

FIG. 2E shows the optical code division multiplex signal 51 when the encoded optical pulse signal 45 of the first channel and the encoded optical pulse signal 49 of the second channel are multiplexed by the multiplexer 50. The multiplexer 50 plays a part of a multiplexer for multiplexing a plurality of channels of optical signals. As FIG. 2C shows, the chip pulse string constituting the encoded optical pulse signal 45 of the first channel and the chip pulse string constituting the encoded optical pulse signal 49 of the second channel are superimposed on the same time base.

The optical code division multiplex signal 51 propagates the transmission line 52, and is sent to the receive section 60. The receive section 60 has a splitter 62, a decoder 64 of the first channel and a decoder 68 of the second channel. The splitter 62 divides the intensity of the optical code division multiplex signal 51 and supplies one to the decoder 64 of the first channel as a split optical code division multiplex signal 63, and supplies the other to the decoder 68 of the second channel as a split optical code division multiplex signal 67. The decoder 64 of the first channel decodes the split optical code division multiplex signal 63 with a code provided as code 1, which is regenerated and output as an optical pulse signal 65 of the first channel, and is input to the signal receive section 67 of the first channel. The optical pulse signal 65 is recognized as a receive signal of the first channel in the signal receive section 67 of the first channel.

The decoder 68 of the second channel also decodes the split optical code division multiplex signal 67 with a code provided as code 2, which is regenerated and output as the optical pulse signal 69 of the second channel, and is input to the signal receive section 71 of the second channel. The optical pulse signal 69 is recognized as a receive signal of the second channel in the signal receive section 71 of the second channel.

The optical pulse signal regenerated by the decoder of the receive section may be called a "decoded optical pulse signal" herein below.

FIGS. 2F and G show decoded optical pulse signals when the intensity of the optical code division multiplex signal 51 is divided by the splitter 62 of the receive section 60 for each first and second channel, and decoded by the decoder 64 of the first channel and the decoder 68 of the second channel.

The decoded optical pulse signal 65 of the first channel will be described. In FIG. 3F, which shows the light intensity of the first channel on the time base, the chip pulse which comes from the optical pulse signal of the second channel is indicated by a hatched rectangle enclosing a number to identify the wavelength, while the rectangle enclosing a number to identify the wavelength is not hatched for the chip pulse which comes from the optical pulse signal of the first channel.

The chip pulse, which comes from the optical pulse signal of the first channel, is a chip pulse encoded with a code provided as code 1 and generated, so if decoded with the same code provided as code 1, each chip pulse is arranged to be the same position on the time base, canceling the time delay generated during encoding. In other words, an original optical pulse signal is regenerated as an auto-correlation waveform.

In the case of the time waveform of light intensity with respect to the time base of the first channel shown in FIG. 2F, unshaded rectangles enclosing numbers 1, 2 and 3 are stacked at a same point in time. On the other hand, the shaded rectangles enclosing numbers 1, 2 and 3 are distributed at different locations on the time base and appear as a cross-correlation waveform. The shaded rectangle enclosing the number 1, 2 or 3 is a chip pulse which comes from the second channel and is a chip pulse constituting the enclosed optical pulse signal encoded with code 2. In other words, the encoded optical pulse signal components of the chip pulse, which comes from the second channel, are formed as a time-spread cross-correlation waveform again, since encoding and decoding are executed with different codes, and therefore the time delay generated during encoding is not cancelled during decoding.

The time waveform of the light intensity with respect to the time base of the second channel in FIG. 2G has an opposite relationship from above. In other words, the chip pulse which comes from the second channel forms an auto-correlation waveform, and the chip pulse which comes from the first channel forms a cross-correlation waveform. This is because the chip pulse which comes from the second channel is encoded with the code provided as code 2, and decoded with the code provided as code 2.

The optical code division multiplex signal 67, of which intensity was divided, is decoded with the code provided as code 2, so in the case of the chip pulse which comes from the first channel encoded with the code provided as code 1 included in the optical code division multiplex signal 67, the time delay generated during encoding is not cancelled during decoding, and a time-spread cross-correlation waveform is formed again. For the chip pulse which comes from the second channel encoded by the code provided as code 2 included in the optical code division multiplex signal 67, on the other hand, the time delay generated during encoding is cancelled during decoding, and an auto-correlation waveform is formed again.

As described above, the decoded optical pulse signal 65 of the first channel and the decoded optical pulse signal 69 of the second channel are formed as the sum of an auto-correlation waveform and a cross-correlation waveform respectively. As FIGS. 2F and G show, the auto-correlation waveform and the cross-correlation waveform have different peak intensities (peak of the auto-correlation waveform is larger), so if the cross-correlation waveform components are removed by performing threshold judgment, that is judging whether the peak value of the waveform is higher or lower than the threshold value which is set in advance, then only the auto-correlation waveform components can be extracted. If the auto-correlation waveform components can be extracted in each channel, the transmitted information can be received by converting the auto-correlation waveform, which is the respective regenerated optical pulse signal, into an electric signal.

In addition to the time-spread/wavelength-hop method, a method of encoding an optical pulse signal using a single wavelength light may be used for the encoding and decoding method. In the case of this method, an optical pulse constituting the optical pulse signal is separated into chip pulses, and encoding is performed by assigning a phase difference to each chip pulse, and arranging them on the time base (for example, see P. C. Teh, et al: "Demonstration of a Four-Channel WDM/OCDMA System Using 255-Chip 320-Gchip/s Quarternary Phase Coding Gratings" IEEE Photonics Technology Letters, Vol. 14, No. 2, February 2002, pp. 227 to 229). This encoding is sometimes called "encoding by time-spreading".

As an example of the means of implementing encoding and decoding, Super Structure Fiber Bragg Grating (SSFBG) is known. SSFBG is constructed by arranging a unit fiber Bragg grating (FBG) in series along the wave guiding direction. From each unit FBG, Bragg reflected light having a specific wavelength is generated.

The structure and operation of an encoder based on SSFBG will now be described with reference to FIGS. 3A and B. FIG. 3A is a diagram depicting the configuration of SSFBG which is constructed by a unit FBG1, unit FBG2 and unit FBG3 of which Bragg reflection wavelength is $\lambda_1$, $\lambda_2$ and $\lambda_3$ respectively, arrayed in series along the wave guiding direction. As FIG. 3A shows, when incident light including three types of wavelengths $\lambda_1$, $\lambda_2$ and $\lambda_3$ enters SSFBG, Bragg reflected lights of which wavelength is $\lambda_1$, $\lambda_2$ and $\lambda_3$ are reflected from each unit FBG to the input end. FIG. 3B shows the effective refractive index distribution of the core of the optical fiber where SSFBG is formed.

The refractive index modulation period (may be called "grating pitch") of the unit FBG1, unit FBG2 and unit FBG3 are $\Lambda_1$, $\Lambda_2$ and $\Lambda_3$ respectively as FIG. 3B shows. Generally the refractive index modulation period $\Lambda$ and the Bragg reflection wavelength $\lambda$ have the relationship $\lambda=2n\Lambda$. Here n is an average refractive index of FBG. In other words, the Bragg reflection wavelength $\lambda$ of the unit FBG is determined by determining the grating pitch $\Lambda$ of the unit FBG.

If a plurality of unit FBGs having different grating pitches are arranged in series in one optical fiber, a light with a waveform corresponding to the grating pitch (hereafter may be called "Bragg reflected light") is acquired from each unit FBG. The Bragg reflected light which is reflected from each unit FBG is reflected with a different time delay respectively according to the location where the unit FBG is positioned. Encoding by time-spread/wavelength-hop based on SSFBG uses this phenomena.

Now a configuration example of the encoder using SSFBG will be described with reference to FIG. 4. The decoder has the same configuration, so only the encoder is described here. The encoder in FIG. 4 is comprised of an SSFBG 10 and an optical circulator 18. The SSFBG 10 is further comprised of a unit FBG1, unit FBG2 and unit FBG3.

Optical pulses to be encoded are input from an input port 14 to the SSFBG 10 via the optical circulator 18 as an input light. The SSFBG 10 has the unit FBG1, unit FBG2 and unit FBG3, so the Bragg reflected lights having different wavelengths are reflected from each unit FBG. These Bragg reflected lights are output from an output port 16 via the optical circulator 18 as encoded optical pulses.

An encoder that can implement encoding by time-spread/wavelength-hop, other than the above mentioned SSFBG, is a means constructed by combining AWG (Arrayed-Waveguide Grating) and an optical delay line (e.g. see S. Yegnanarayanan, et al: "An incoherent wavelength hopping/time spreading code-division multiple access system", ECOC' 99, 26-30 Sep. 1999).

A method of extracting auto-correlation waveform components by separating the auto-correlation waveform components and the cross-correlation waveform components from the optical pulse signal decoded at the receive side, other than the above mentioned method of using threshold judgment, is a method based on a time gate. The method based on a time gate is a method of using a time gate means which adjusts the time so that the cross-correlation waveform component and the auto-correlation waveform component do not overlap, and allows signals to pass only in the time zone when auto-correlation waveform components pass.

As the time gate means, a method based on a time gate using an electron-absorption modulator (EA modulator) is known (e.g. see Naoki Minato, et al: "Transmission design and evaluation of data rate enhanced time-spread/wavelength-hopping optical code division multiplexing using fiber-Bragg-grating" Technical Report IEICE, CS 2003-17, OCS2003-24, PS2003-24, May 2003, pp. 49 to 54). In other words, a time gate is implemented by increasing the transmittance of the EA modulator only in the time zone when the auto-correlation waveform components pass, and decreasing it in the time zone when cross-correlation waveform components pass. Clock signals are used for the control of transmittance of the EA modulator.

Also as the time gate means, a method based on a time gate using an SOA (Semiconductor Optical Amplifier) is known (e.g. see K. Kitayama, et al: "Optical Code Division Multiplexing (OCDM) and Its Applications to Photonic Networks" IEICE Trans. Fundamentals, Vol. E82-A, No. 12, December 1999, pp. 2616 to 2626). According to this method, an optical clock is extracted first from a part of a signal decoded by a mode locked laser diode. Then the decoded signal and the optical clock are input to the SOA, and are synchronized in the SOA to generate a Four Wave Mixing (FWM) effect. And the time gate means is implemented by allowing only optical pulses in the time zone, when SOA is in ON status, to pass the SOA by the Four Wave Mixing effect generated synchronizing the optical clock.

A feature of the optical communication system based on OCDM is that the increase/decrease of the number of channels can be handled flexibly. In the optical communication system based on OCDM, a channel can be added merely by adding the type of codes, only if the size of the ratio of the peak value of the cross-correlation waveform components and the peak value of the auto-correlation waveform components can be assured to be at a level where the cross-correlation waveform components can be removed from the decoded optical pulse signal so as to extract the auto-correlation waveform components. In other words, a new channel can be added merely by adding an encoding section and a decoding section where a new code corresponding to the new channel to be added is set, without changing the composing portion for the channels, other than the channel to be added in the optical communication device.

The transmission/reception based on OCDM has the above mentioned advantageous feature where a plurality of channels of optical pulse signals can be transmitted simultaneously in one optical fiber transmission line.

Therefore if a system, where WDM transmission/reception and OCDM transmission/reception can coexist, can be implemented by attaching the OCDM transmission/reception system to the WDM transmission/reception system in parallel, the number of channels which allow transmission/reception can be further increased. But in order to implement a system where WDM transmission/reception and OCDM transmission/reception can coexist merely by attaching the OCDM transmission/reception to the WDM transmission/reception system in parallel, the wavelength band of a conventional optical multiplex communication system based on WDM must be changed.

SUMMARY OF THE INVENTION

With the foregoing in view, it is an object of the present invention to provide an optical multiplex communication system where the optical wavelength division channels and optical code-division channels coexist by adding optical code-division channels, without changing the wavelength bands used by the conventional optical wavelength division channels.

To achieve the above object, according to the essential character of the present invention, an optical multiplex communication system having the following configuration is provided. The optical multiplex communication system of the present invention is a communication system which has an optical delay unit for providing time delay to an optical pulse constituting a wavelength division optical pulse signal for each optical wavelength division channel, in the optical wavelength division channel section of a transmission section. This optical delay unit provides the time delay required for not matching a position of an optical pulse constituting the wavelength division optical pulse signal on a time base and a position of a chip pulse which has a same wavelength as this optical pulse constituting the encoded optical pulse signal on the time base.

More specifically, the optical multiplex communication system of the present invention is an optical multiplex communication system where an optical wavelength division channel and an optical code division channel can coexist, and has a transmission section and a receive section.

Here the optical wavelength division channel and the optical code division channel are channels for transmission/reception by optical wavelength division and optical code division respectively.

The transmission section has an optical code division channel section and an optical wavelength division channel section in parallel, and has a multiplexer for generating an optical division multiplex signal by multiplying the encoded optical pulse signal and the wavelength division optical pulse signal. The optical code division channel section assigns a mutually different time-spread/wavelength-hop code to each optical code division channel, and generates an encoded optical pulse signal by encoding the optical pulse signal of each optical code division channel by the encoder. The optical wavelength division channel section assigns a mutually different wavelength to each optical wavelength channel and generates a wavelength division optical pulse signal.

A receive section has a demultiplexer for separating the optical division multiplex signal into an optical code division multiplex receive signal and an optical wavelength division multiplex receive signal, and has an optical code division multiplex signal extraction section and an optical wavelength division multiplex signal extraction section in parallel.

The optical code division multiplex signal extraction section has a decoder and a time gate processing control section. The decoder generates a decoded optical code division signal by decoding the optical code division multiplex receive signal for each of the optical code division channels using a same code as the time-spread/wavelength-hop code. The time gate processing control section supplies clock signals for performing time gate processing for regenerating an optical pulse signal of the optical code division channel to a time gate unit.

The optical wavelength division multiplex signal extraction section has a wavelength demultiplexer, a threshold judgment unit and a clock signal extraction section. The wavelength demultiplexer performs wavelength division on the optical wavelength division multiplex receive signal and extracts the optical pulse signal components of each optical wavelength division channel for each optical wavelength division channel. The threshold judgment unit performs a threshold judgment on the optical pulse signal components of each optical wavelength division channel, and regenerates an optical pulse signal of each optical wavelength division channel. The clock signal extraction section extracts the clock signal from the optical pulse signal components of one of the optical wavelength division channels, and supplies it to the time gate processing control section.

Characteristic of the optical multiplex communication system of the present invention is that all the channels in the wavelength division channel section have an optical delay unit. This optical delay unit provides the time delay required for not matching a position of an optical pulse constituting the wavelength division optical pulse signal on a time base and a position of a chip pulse constituting the encoded optical pulse signal which has a same wavelength as this optical pulse on the time base, to the optical pulse constituting the wavelength division optical pulse signal.

The delay quantity to be set for the optical delay unit of each of the wavelength division channels is determined by a delay quantity adjustment method which includes the following steps.

(1) A first step of generating a test optical pulse string that includes mutually different wavelength components which are at least the same number as the number of channels, and that is constructed by test optical pulses arrayed on a time base at an equal interval and dividing this test optical pulse string into a first test optical pulse string and a second test optical pulse string, (2) a second step of inputting the first test optical pulse string and the second test optical pulse string to the optical code division channel section and the optical wavelength division channel section respectively, (3) a third step of outputting the second test optical pulse string from the optical wavelength division channel section, while encoding the first test optical pulse string in the optical code division channel section, and outputting the pulse string as an encoded test optical pulse string, and (4) a fourth step of adjusting the delay quantity sequentially for all the optical delay units arranged in the optical wavelength division channels, for each optical delay unit arranged for each of the optical wavelength division channels, according to the following procedures (a) and (b).

(a) While observing the encoded test optical pulse string filtered by a band pass filter for transmitting a wavelength assigned to the optical wavelength division channel where the optical delay unit is arranged, and a test optical pulse string of the optical wavelength division channel to which this wavelength is assigned, simultaneously as a time waveform, and (b) setting a time delay quantity so that a chip pulse constituting the encoded test optical pulse string, and an optical pulse constituting the test optical pulse string of the optical wavelength division channel to which the wavelength, which is the same wavelength as the chip pulse, is assigned, do not match on a time base.

It is preferable that the above mentioned encoder and decoder have a fiber Bragg grating. Also it is preferable that the threshold judgment unit has a non-linear fiber loop or a saturable absorber. Also it is preferable that the time gate processing control section has a clock signal extraction and an electron-absorption modulator.

Characteristic of the optical multiplex communication system of the present invention is that each optical wavelength division channel has an optical delay unit, which provides a time delay to a wavelength division optical pulse signal. This makes it possible not to overlap a position of the optical pulse constituting the wavelength division optical pulse signal on a time base, and a position of the chip pulse constituting the encoded optical pulse signal having the same wavelength as this optical pulse on the time base. The delay quantity to be set for each optical delay unit can be determined specifically by the delay quantity adjustment method comprised of the above mentioned first to fourth steps.

The optical pulse signal of the optical wavelength division channel is regenerated for each channel by the receive section separating only the wavelength components assigned to each channel. Therefore the intensity of the chip pulse component, which comes from the optical code division channel and which mixes into an arbitrary channel belonging to the optical wavelength division channels, is 1/number of optical wavelength division channels.

In other words, the intensity of the chip pulse component, which comes from the optical code division channel and which mixes into an arbitrary channel belonging to the optical wavelength division channels, never exceeds the intensity of the optical pulse constituting the optical pulse signal which is generated for each channel. Therefore only the receive signal of the local channel can be extracted in the optical wavelength division channel by performing threshold processing, that is, by setting a value larger than the intensity of the chip pulse component, which comes from the optical code division channel, as a threshold, and removing optical pulse components having an intensity lower than this threshold.

In an arbitrary channel belonging to the optical code division channels, on the other hand, a peak intensity of an auto-correlation waveform which is a receive signal and an optical pulse which comes from the optical wavelength division may possibly become equal, as mentioned later. Therefore only the receive signals of the local channel cannot be extracted by the above mentioned threshold processing. So the time gate processing must be performed to extract only the peak of the auto-correlation waveform.

To perform time gate processing, clock signals are required, and clock signals can be extracted from the optical signal components of an arbitrary channel belonging to the optical wavelength division channels. In theory clock signals can also be extracted from the decoded optical code division signal of an arbitrary channel belonging to the optical code division channels, but the ratio of noise components to the auto-correlation waveform components included in the decoded optical code division signal of each channel, which is output from the decoder, is too large, and the stable extraction of clock signals is difficult. Therefore it is preferable to extract clock signals from the optical signal components of an arbitrary channel belonging to the optical wavelength division channels.

In order to extract only the peak of the auto-correlation waveform with certainty by time gate processing, which is performed in an arbitrary channel belonging to the optical code division channels, another condition must be satisfied. This condition is that the relative positions of the wavelength division optical pulse signal and the encoded optical pulse signal on the time base are set such that the peak of the auto-correlation waveform passes through the time gate processing control section when the signal is in a passing state (this may also be called "window open state") in the time gate processing control section, and an optical pulse, which comes from the optical wavelength division channel, never passes through at this time.

One of the specific methods for satisfying the condition that the optical pulse, which comes from the optical wavelength division channel, does not pass through when the window of the time gate processing control section is in an open state, is setting the relative positions of the wavelength division optical pulse signal and the encoded optical pulse signal on the time base so as not to match the position of an optical pulse constituting the wavelength division optical pulse signal on the time base, and the position of a chip pulse constituting the encoded optical pulse signal which has the same wavelength as this optical pulse on the time base.

If the encoded optical pulse signal and the wavelength division optical pulse signal are multiplexed and sent in a state where the position of the optical pulse constituting the wavelength division optical pulse signal on the time base and the position of a chip pulse constituting the encoded optical pulse signal which has the same wavelength as this optical pulse do not match, the optical pulse which comes from the optical wavelength division channel never appears superimposed on the peak position of the auto-correlation waveform of the optical code division channel acquired by being decoded in the receive section.

If the encoder and decoder are comprised of fiber Bragg grating, the fiber Bragg grating, which is formed using an optical fiber, is convenient for connection, since the transmission line of the optical division multiplex transmitter/receiver is constructed by an optical fiber. In other words, an optical circulator is used to form the encoder and decoder as mentioned above, and fiber Bragg grating is very convenient to be connected with the optical circulator.

Also, if the threshold judgment unit is comprised of a non-linear fiber loop, threshold judgment is performed using the non-linear optical effect, so a dramatically faster threshold judgment operation can be executed compared with the threshold judgment operation based on an electric method. Particularly, when the communication speed becomes faster, the merit to perform threshold judgment not by an electric method but by using the non-linear optical effect is high. Also if the threshold judgment unit is comprised of a saturable absorber as well, a dramatically faster threshold judgment operation can be executed compared with the threshold judgment operation based on an electrical method.

The threshold judgment unit using a saturable absorber has resistance against optical breakdown and mechanical breakdown, water resistance, and also has long life. Therefore the threshold judgment unit constructed using a saturable absorber is suitable for an optical multiplex transmitter/receiver.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

Figure 1:
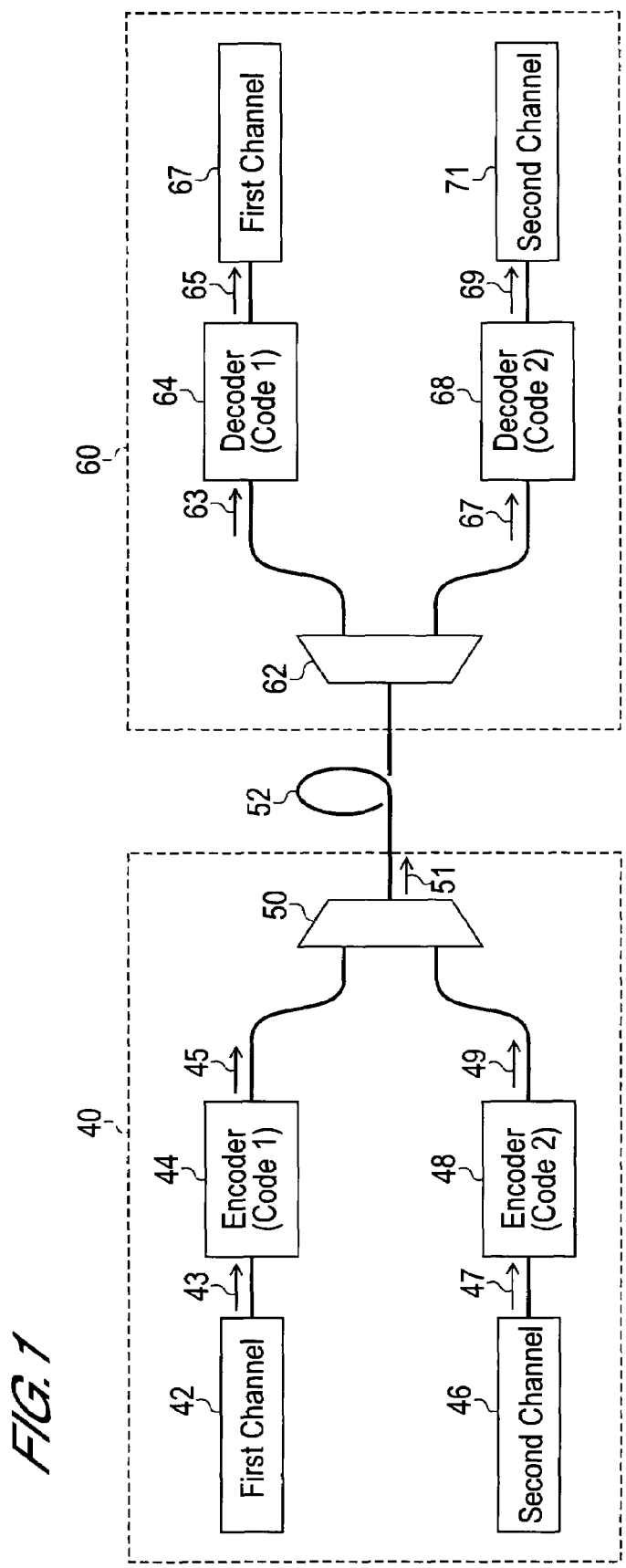
FIG. 1 is a block diagram depicting the time-spread/wavelength-hop OCDM system.
Figure 2A:
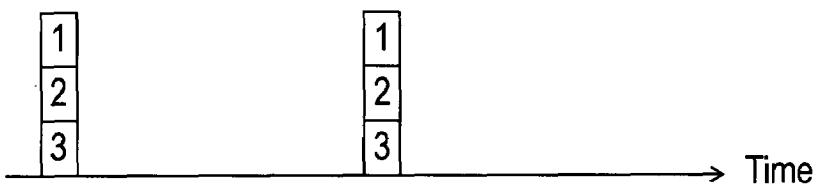
FIG. 2 are diagrams depicting time-based waveforms of signals at each location in the time-spread/wavelength-hop OCDM system.
Figure 2B:
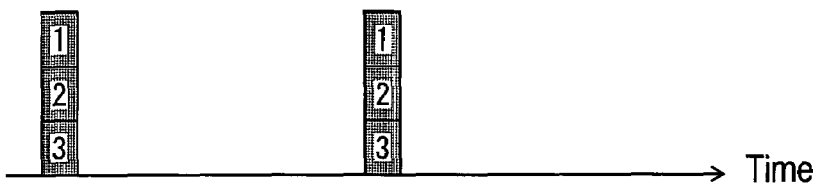
Figure 2C:
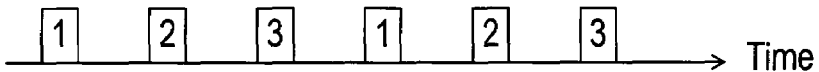
Figure 2D:
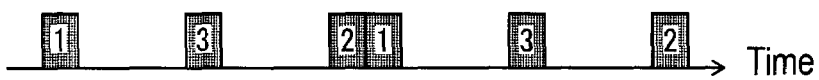
Figure 2E:
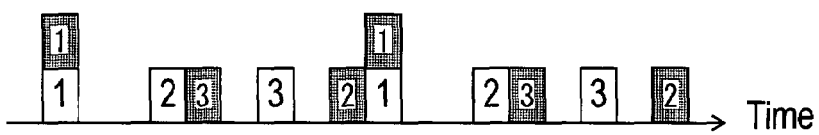
Figure 2F:
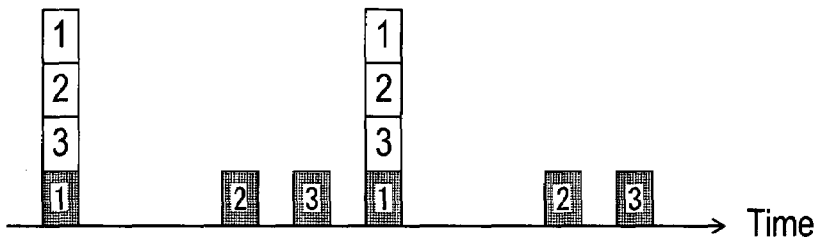
Figure 2G:
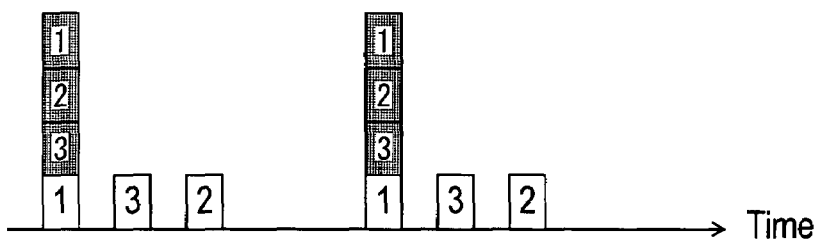
Figure 3A:
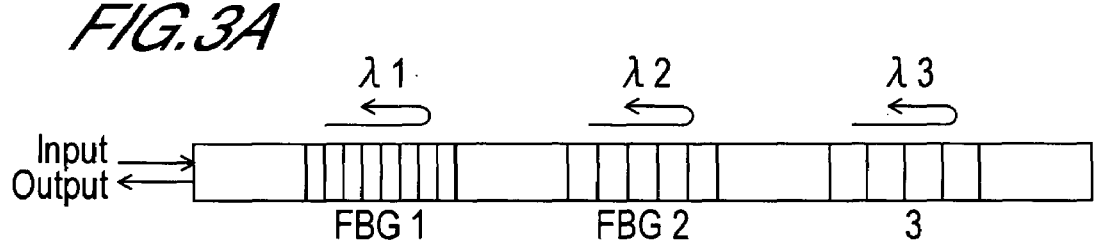
FIG. 3 are diagrams depicting the configuration of SSFBG.
Figure 3B:
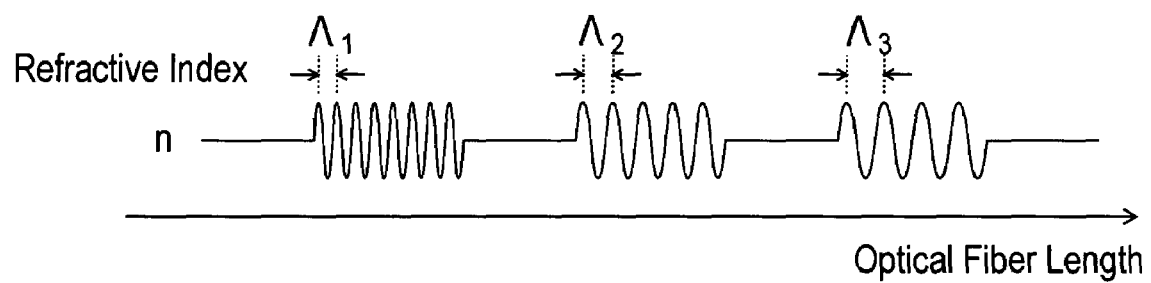

Embodiments of the present invention will now be described with reference to the drawings. Each drawing merely indicates a configuration example of this invention, and generally shows cross-sectional forms, positional relationships and other aspects of each composing element in order to assist in understanding this invention, and shall not limit the present invention to the illustrated examples. In the following description, specific materials and conditions may be used, but these materials and conditions are merely one of the preferred examples, and shall not limit the invention. In each drawing, the same composing elements are denoted with the same reference numerals, and redundant description thereof may be omitted.

Embodiments

The optical multiplex communication system of the present invention will be described with reference to FIG. 5.

Figure 5:
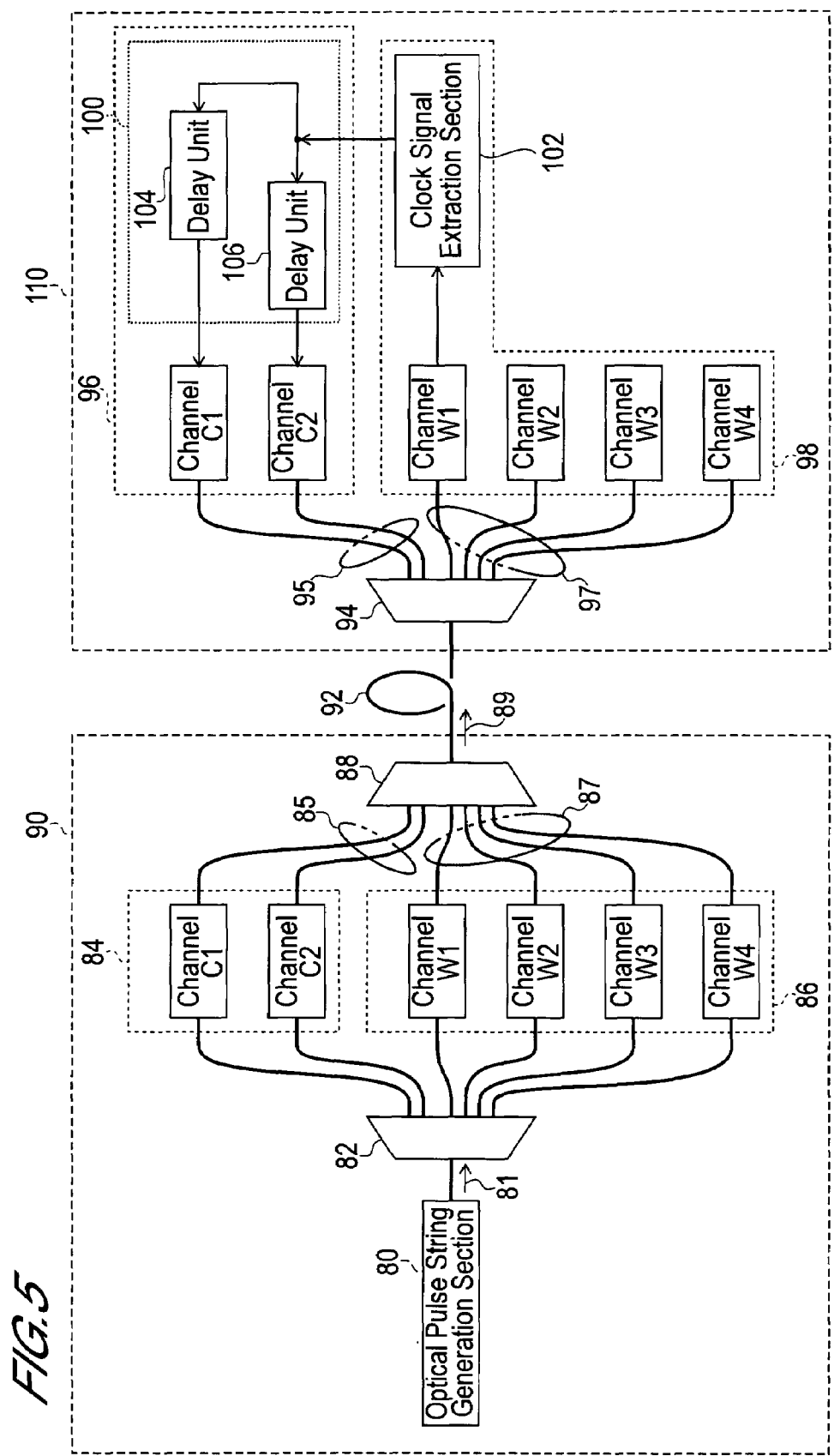
FIG. 5 is a block diagram depicting the optical multiplex communication system of the present invention.

FIG. 5 is a block diagram depicting the optical multiplex communication system of the present invention. The optical multiplex communication system of the present invention is an optical multiplex communication system where an optical code division channel section 84 and an optical wavelength division channel section 86 can coexist, and has a transmission section 90 and a receive section 110. Hereafter the optical wavelength division channel may be called "WDM channel", and the optical code division channel may be called "OCDM channel".

In the embodiment in FIG. 5, the OCDM channel 84 has channel C1 and channel C2, a total of 2 channels, and the WDM channel section 86 has channel W1 to channel W4, a total of four channels. The following description is also valid even if the OCDM channel section 84 and the WDM channel section 86 have the number of channels different from those in FIG. 5.

The transmission section 90 has an optical pulse string generation section 80 and a splitter 82, and has the OCDM channel section 84 and the WDM channel section 86 in parallel.

The optical pulse string generation section 80 generates and outputs an optical pulse string 81 which includes at least the same number of mutually different wavelength components as the number of channels of the WDM channel section 86 on the wavelength axis, and which is a string of optical pulses arranged with an equal interval on the time base. This optical pulse string 81 is divided based on the light intensity by the splitter 82, and supplied to the channel C1 and channel C2 of the OCDM channel section 84 and channel W1 to channel W4 of the WDM channel section 86 respectively.

The OCDM channel section 84 generates an encoded optical pulse signal group 85 by assigning a mutually different time-spread/wavelength-hop code to each OCDM channel (for each channel C1 and channel C2), and encoding the optical pulse signal of each OCDM channel using the encoder.

The WDM channel section 86 assigns a mutually different wavelength to each WDM channel (to each channel W1 to channel W4), and generates the wavelength division optical pulse signal group 87.

The transmission section 90 further has a multiplexer 88 which multiplexes the above mentioned encoded optical pulse signal group 85 and the wavelength division optical pulse signal group 87, and generates the optical division multiplex signal 89, and the optical division multiplex signal 89 which is output from the multiplexer 88, propagates the transmission line 92, and is transferred to the receive section 110.

The receive section 110 has a splitter/demultiplexer 94 for dividing the optical division multiplex signal 89 into an optical code division multiplex receive signal group 95 and an optical wavelength division multiplex receive signal group 97, and has an optical code division multiplex signal extraction section 96 and an optical wavelength division multiplex signal extraction section 98 in parallel. The receive section 110 also has a time gate processing control section 100 to perform time gate processing in the optical code division multiplex signal extraction section 96.

The time gate processing control section 100 has a clock signal extraction section 102, a delay unit 104 and a delay unit 106. The delay unit 104 and the delay unit 106 adjust the phase of the clock signals to be supplied to the time gate units of the channel C1 and channel C2 respectively. Generally the delay unit for adjusting the phase of the clock signals must be installed for each OCDM channel, so the same number of delay units as the OCDM channels are required.

Figure 6:
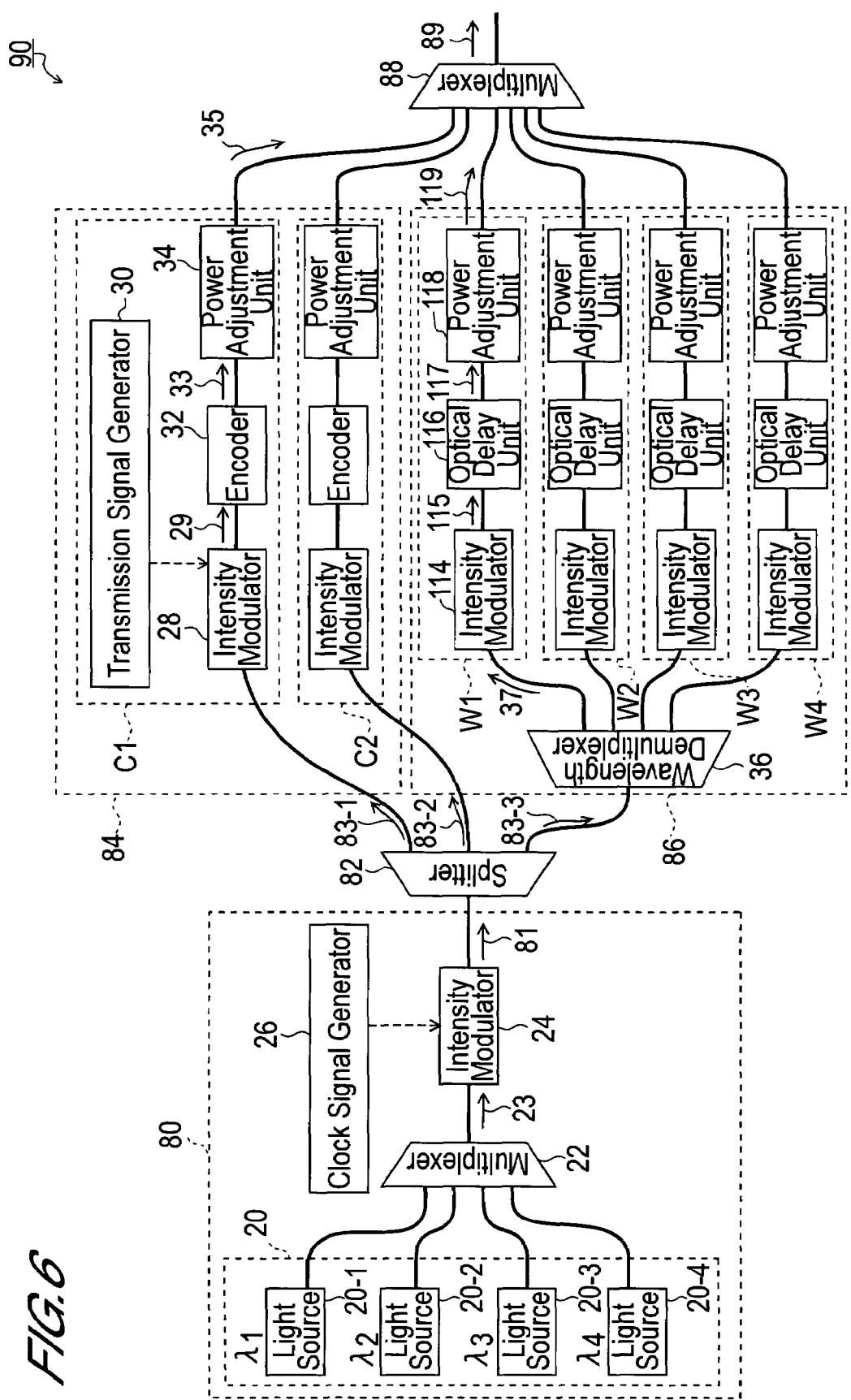
FIG. 6 is a block diagram depicting the transmission section of the optical multiplex communication system of the present invention.

Now the configuration of the transmission section 90 will be described more specifically with reference to FIG. 6. FIG. 6 is a block diagram depicting the transmission section of the optical multiplex communication system of the present invention.

First the optical pulse string generation section 80 will be described. The optical pulse string generation section 80 is comprised of a light source group 20, a multiplexer 22, an intensity modulator 24, and a clock signal generator 26 for supplying clock signals to the intensity modulator 24. Here the WDM channel section 86 has a 4 channel configuration, so the optical pulse string generation section 80 must generate optical pulse strings which array at an equal interval on the time base, including the mutually different four types of wavelengths, wavelengths $\lambda_1$, $\lambda_2$, $\lambda_3$ and $\lambda_4$.

The light source group 20 is comprised of light sources 20-1, 20-2, 20-3 and 20-4 which generate continuous wave light having mutually different wavelengths $\lambda_1$, $\lambda_2$, $\lambda_3$ and $\lambda_4$ respectively. The respective continuous wave lights which are output from the light sources 20-1, 20-2, 20-3 and 20-4 are multiplexed by a multiplexer 22, are output as continuous wave light 23 including the wavelengths $\lambda_1$, $\lambda_2$, $\lambda_3$ and $\lambda_4$, and input to the intensity modulator 24. Clock signals are supplied from the clock signal generator 26 to the intensity modulator 24, and the continuous wave light 23 is converted into the optical pulse string 81 and output by the clock signals.

In other words, the optical pulses constituting the optical pulse string 81 includes the lights of which wavelengths are $\lambda_1$, $\lambda_2$, $\lambda_3$ and $\lambda_4$. Optical pulses including the lights of which wavelengths are $\lambda_1$, $\lambda_2$, $\lambda_3$ and $\lambda_4$ means the state where the optical pulses of which central wavelengths are $\lambda_1$, $\lambda_2$, $\lambda_3$ and $\lambda_4$ respectively are superimposed on a same time base.

For the intensity modulator 24, an EA modulator, for example, can be used.

The optical pulse string 81 is input to the splitter 82, split into the optical pulse strings 83-1, 83-2 and 83-3, which are input to channel C1, channel C2 and the wavelength demultiplexer 36 of the WDM channel section 86 respectively.

Channel C1 is comprised of an intensity modulator 28, encoder 32 and power adjustment unit 34. In the OCDM channel section 84, a code which is set in an encoder is different depending on the channel. In other words, each channel is identified by the difference of this code. The information transmitted by channel C1 is supplied to the intensity modulator 28 by the transmission signal generator 30 as a binary digital electric signal. The intensity modulator 28 has a function to convert a binary digital electric signal, which is transmission information of channel C1, into an RZ (Return to Zero) formatted optical pulse signal. For the intensity modulator 28, an EA modulator, for example, can be used. The optical pulse string 83-1, which is input to the intensity modulator 28, is output as an optical pulse signal 29 reflecting the transmission information of channel C1, and is input to the encoder 32.

Hereafter it is assumed that the expression "optical pulse signal" is used only when it refers to a string of optical pulses which reflects a binary digital electric signal, and which are acquired by performing optical modulation on an optical pulse string, and converting the electric pulse signal into an optical pulse signal. The expression "optical pulse string", on the other hand, is assumed to indicate all of the optical pulses which array regularly with a predetermined interval (time slot) on the time base.

The optical pulse signal 29 is input to the encoder 32 for time-spread/wavelength-hop encoding, and is output as an encoded optical pulse signal 33. A code for identifying the channel C1 is set for the encoder 32, and this code is the same as the code being set for the decoder 70 in the later mentioned receive section 110. Encoding by time-spread/wavelength-hop codes was described above, so description thereof is omitted here.

Figure 4:
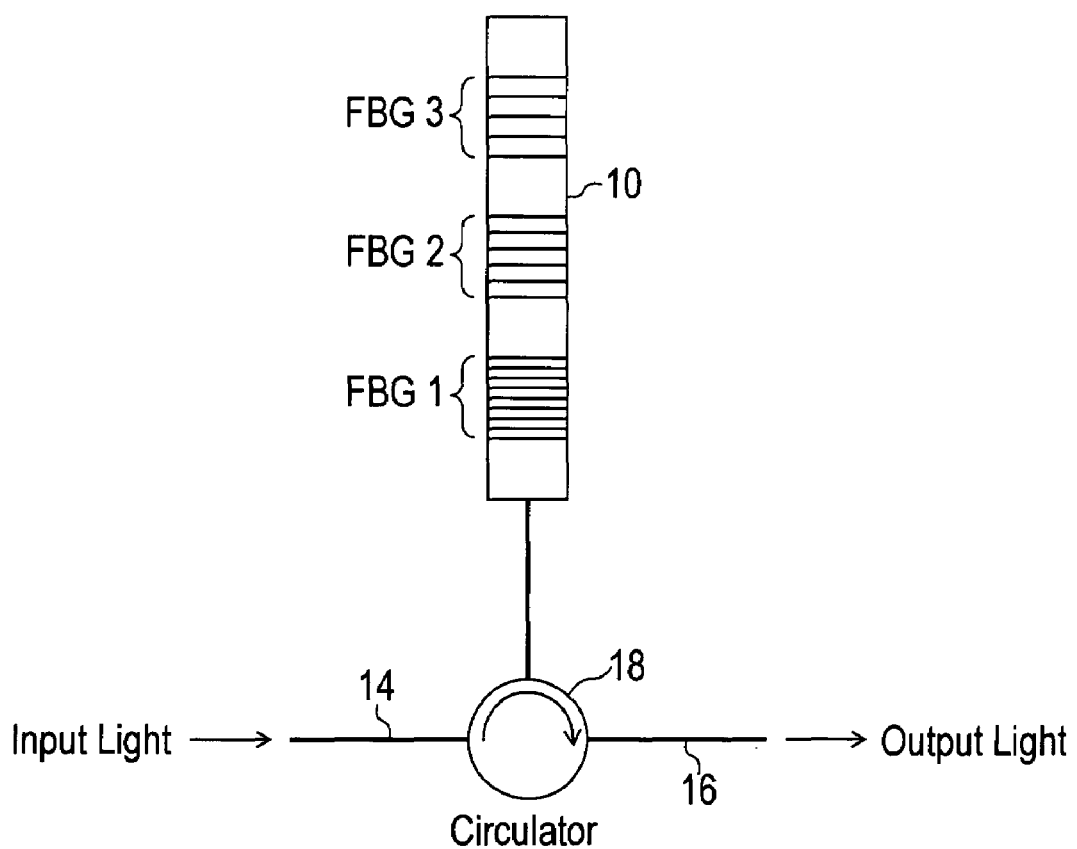
FIG. 4 is a diagram depicting the configuration of the encoder and the decoder.

For the encoder or decoder, the above mentioned SSFBG can be used. Specifically, SSFBG can be used as an encoder or decoder similar to the encoder described with reference to FIG. 4. Also for the encoder or decoder, such an element as a transversal filter, can be used instead of SSFBG, but in the following description, it is assumed that the encoder or decoder is constructed using SSFBG. In any case, when an encoder using an optical circulator as shown in FIG. 4 is used as the encoder or decoder, SSFBG that can be easily connected to the optical circulator is very convenient, as mentioned above.

The encoded optical pulse signal 33 is input to the power adjustment unit 34, where the power thereof is adjusted, and is output as the encoded optical pulse signal 35. This power adjustment unit 34 is also installed in channel C2 in the same way. If the intensity of the encoded optical pulse signal is very different depending on the OCDM channel, the cross-correlation waveform component included in the decoded optical pulse signal decoded by the decoder of the receive section 110 may become similar to or higher than the auto-correlation waveform component. If this occurs, the operation to extract only auto-correlation waveform components may possibly be affected in the time gating processing. In other words, if the intensity of a specific channel out of the OCDM channels is extremely small, the auto-correlation waveform component extracted by the time gating processing may be judged as a noise component by mistake.

The configuration of channel C1 was described above, but channel C2 is also the same as Channel C1, except the optical pulse string 83-2 is input to channel C2. The transmission signal generator to supply the transmission signal of channel C2 to the intensity modulator of channel C2 is omitted in the drawing.

The WDM channel section 86, on the other hand, is comprised of a wavelength demultiplexer 36 and WDM channels W1 to W4. The optical pulse string 83-3 is input to the wavelength demultiplexer 36 of the WDM channel section 86. The optical pulse string 83-3 includes the wavelength components of wavelengths $\lambda_1, \lambda_2, \lambda_3$ and $\lambda_4$, and is a string of optical pulses which array with an equal interval on the time base. This optical pulse string 83-3 is distributed into each WDM channel as optical pulses with different wavelengths by the wavelength demultiplexer 36. For example, the optical pulse 37 of which wavelength is $\lambda_1$, is distributed to channel W1. In other words, each WDM channel is identified by the difference of the waveform. For the wavelength demultiplexer 36 and the later mentioned wavelength demultiplexer 76 (see FIG. 7), an optical element having a wavelength separation function, such as AWG, can be used, for example.

The intensity modulator 114 has a function to convert the binary digital electric signal, which is transmission information of channel W1, into an RZ-formatted optical pulse signal. In FIG. 6, however, the transmission signal generator for supplying the transmission signal of each WDM channel to the intensity modulator, which is set in each WDM channel section 86, is omitted. The intensity modulator 114 is the same as the intensity modulator 28 of channel C1, so the description thereof is omitted. The optical pulse 37, which is input to the intensity modulator 114, is output as the wavelength division optical pulse signal 115 reflecting the transmission information of channel W1. The wavelength of the wavelength division optical pulse signal 115 is $\lambda_1$.

The optical delay unit 116 has a function to provide the time delay required for not matching the position of an optical pulse constituting the wavelength division optical pulse signal 117 which is output from the optical delay unit 116, and the position of a chip pulse constituting the encoded optical pulse signal 115 which comes from the OCDM channel, which has the same wavelength as this optical pulse.

The wavelength division optical pulse signal 117 is input to the power adjustment unit 118, where the power thereof is adjusted, and is output as the wavelength division optical pulse signal 119. This power adjustment unit 118 is also installed in channel W2 to channel W4 respectively in the same way. If the intensity of the wavelength division optical pulse signal differs considerably depending on the WDM channel, the optical pulse signal of the WDM channel, which is extracted after threshold processing is performed by the threshold judgment unit of the receiving section 110, may be judged as a noise component by mistake.

The configuration of channel W1 was described above, but the configuration of channel W2 to channel W4 is also the same, so redundant description will be omitted.

The encoded optical pulse signals of all the channels to be output from the OCDM channel section 84, including the encoded optical pulse signal 35 of channel C1, and the wavelength division optical pulse signals of all the channel to be output from the WDM channel section 86, including the wavelength division optical pulse signal 119 of channel W1, are multiplexed by the multiplexer 88, and generated and output as the optical division multiplex signal 89. And the optical division multiplex signal 89 propagates through the transmission line 92 (see FIG. 5) constructed by an optical fiber, and is sent to the receive section 110.

Figure 7:
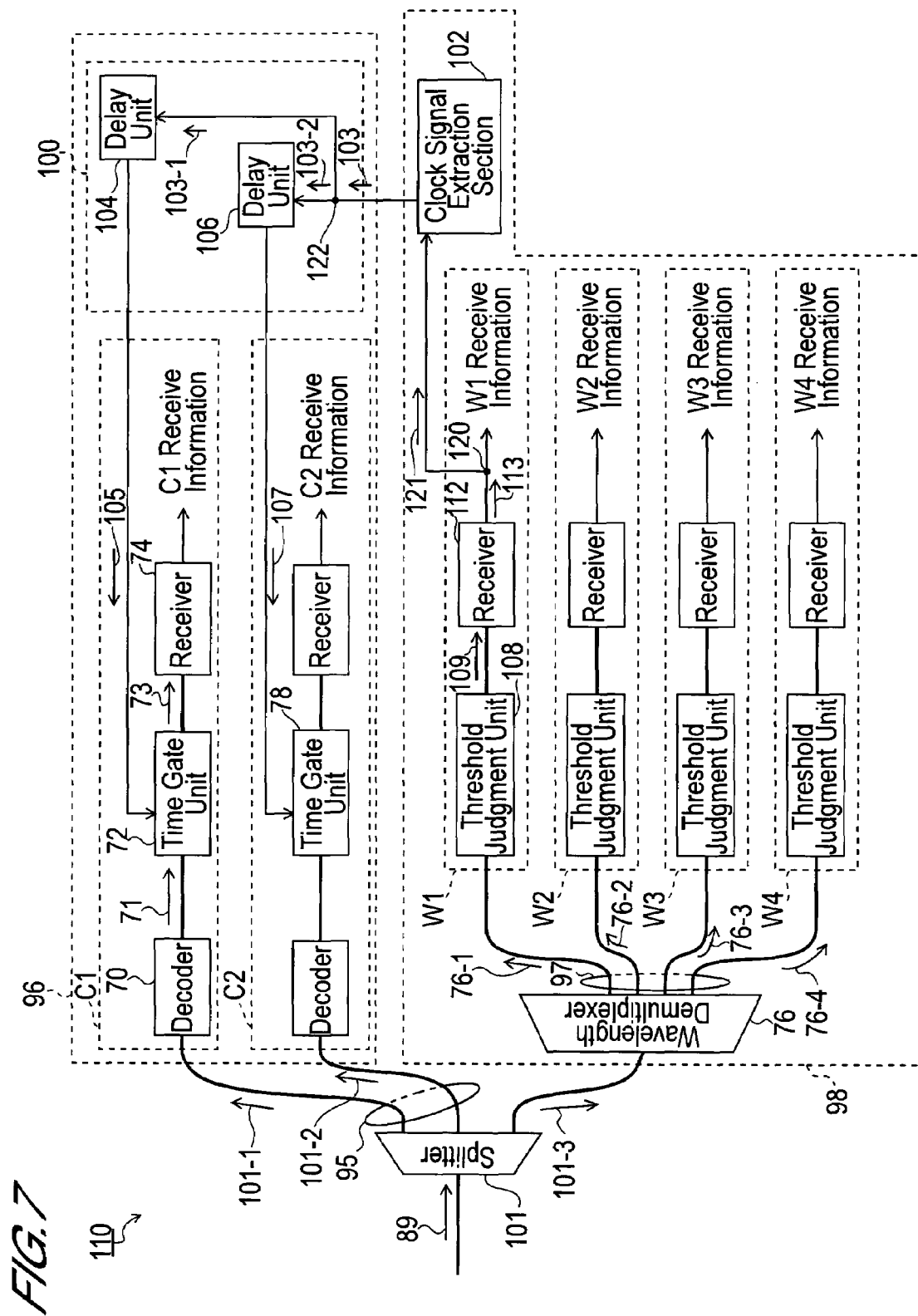
FIG. 7 is a block diagram depicting the receive section of the optical multiplex communication system of the present invention.

Now the configuration of the receive section 110 will be described more specifically with reference to FIG. 7. FIG. 7 is a block diagram depicting the receive section of the optical multiplex communication system of the present invention.

The receiving section 110 is comprised of a splitter 101, an optical code division multiplex signal extraction section (hereafter may be called "OCDM signal extraction section") 96, and an optical wavelength division multiplex signal extraction section (hereafter may be called "WDM signal extraction section") 98, and the OCDM signal extraction section 96 and the WDM signal extraction section 98 are connected in parallel. First the configuration of the OCDM signal extraction section 96 will be described.

In the OCDM signal extraction section 96, a plurality of OCDM channels (channel C1 and channel C2 in this case) are installed in parallel. Just like the case of the description on the above mentioned OCDM channel section 84, channel C1 is represented in the description.

Channel C1 is comprised of a decoder 70, time gate unit 72 and a receiver 74. The code which is set for the decoder differs depending on the channel. A same code is set for the encoder installed in each channel of the transmission section 90 and the decoder installed in each channel of the receive section 110 depending on the corresponding channel.

In the description on the optical multiplex communication system of the present invention with reference to FIG. 5, it was simply described that the optical division multiplex signal 89 is divided into the optical code division multiplex receive signal (hereafter may be called "OCDM receive signal") group 95 and the optical wavelength division multiplex receive signal (hereafter may be called "WDM receive signal") group 97 by the splitter/demultiplexer 94.

However, in a more detailed description, the splitter/demultiplexer 94 is comprised of a splitter 101 and a wavelength demultiplexer 76. The optical division multiplex signal 89 is intensity-divided into three, that is intensity division signals 101-1, 101-2 and 101-3, by the splitter 101. And the intensity division signal 101-3 is wavelength-divided into four, that is wavelength division signals 76-1, 76-2, 76-3 and 76-4 by the wavelength demultiplexer. The intensity division signals 101-1 and 101-2 correspond to the OCDM receive signal group 95 described with reference to FIG. 5, and the wavelength division signals 76-1, 76-2, 76-3 and 76-4 correspond to the WDM receive signal group 97 described with reference to FIG. 5.

Since the optical division multiplex signal 89 is a signal generated by the multiplexer 88 multiplexing the encoded optical pulse signal of each OCDM channel and the wavelength division optical pulse signal of each WDM channel, all of the intensity division signals 101-1, 101-2 and 101-3, which are acquired by the splitter 101 intensity-dividing this optical division multiplex signal 89, are signals equally including the encoded optical pulse signal of each OCDM channel and the wavelength division optical pulse signal of each WDM channel.

The OCDM receive signal (corresponds to the intensity division signal 101-1) which is distributed to channel C1 out of the OCDM receive signal group 95 to be supplied to the OCDM signal extraction section 96 is input to the decoder 70, and decoded and output as the decoded optical code division signal (hereafter may be called "decoded OCDM signal") 71. The decoded OCDM signal 71 is input to the time gate unit 72, where time gate processing is performed, and is output as the optical pulse signal 73 of channel C1. The optical pulse signal 73 is input to the receiver 74, converted into the electric pulse signal 74, and is recognized as the receive signal of channel C1. In other words, the transmission information of channel C1, which is sent from the transmission section 90, is received by the receive section 110 as the receive information of channel C1.

Now the intensity division signal 101-3 to be supplied to the WDM signal extraction section 98 will be described. Here too, just like the case of the description on the OCDM signal extraction section 96, channel W1 is represented in the description. The intensity division signal 101-3 to be supplied to the WDM signal extraction section 98 is input to the wavelength demultiplexer 76, and demultiplexed as an optical signal with wavelength corresponding to each WDM channel, and is supplied to the threshold judgment unit of each channel. For the wavelength division receive signal 76-1 with wavelength $\lambda_1$, which is supplied to the threshold judgment unit 108 of channel W1, threshold judgment processing is performed and an optical pulse signal 109 of channel W1 is extracted, and is input to the receiver 112, converted into electric pulse signal 113 (O/E conversion), and received as receive information of channel W1. In other words, the transmission information of channel W1, which is sent from the transmission section 90, is received by the receive section 110 as the receive information of channel W1.

The electric pulse signal 113 is intensity-divided by a first electric signal splitter 120, and a clock signal extraction signal 121 is extracted. The clock signal extraction signal 121 is input to the clock signal extraction section 102, where an electric clock signal 103 is generated, and output. The electric clock signal 103 is split into two, that is electric clock signals 103-1 and 103-2, by a second electric signal splitter 122.

Here, as a configuration of extracting the clock signal from the optical pulse signal component of one of the WDM channels and supplying it to the time gate processing control section 100, an example of extracting the clock signal from the electric pulse signal 113, which is output from the receiver 112, by the clock signal extraction section 102, is shown. However, the present invention is not limited to this configuration, but a configuration of extracting an optical clock signal from the optical pulse signal 109, which is output from the threshold judgment unit 108, by an optical means, converting this clock signal into an electric signal and supplying it to the time gate processing control section 100 as the electric clock signal 103, may be used. For the method of extracting the optical clock signal from the optical pulse signal 109, a known appropriate method using an optical fiber loop or a mode locked laser can be used.

The electric clock signal 103-1 is input to the delay unit 104, where time delay is added, and is output as an electric clock signal 105, and is supplied to the time gate unit 72 of channel C1. The electric clock signal 103-2 is input to the delay unit 106, where a delay quantity different from the delay quantity for the electric clock signal 103-1 is added, and is output as an electric clock signal 107, and is supplied to the time gate unit 78 of channel C2.

Figure 8:
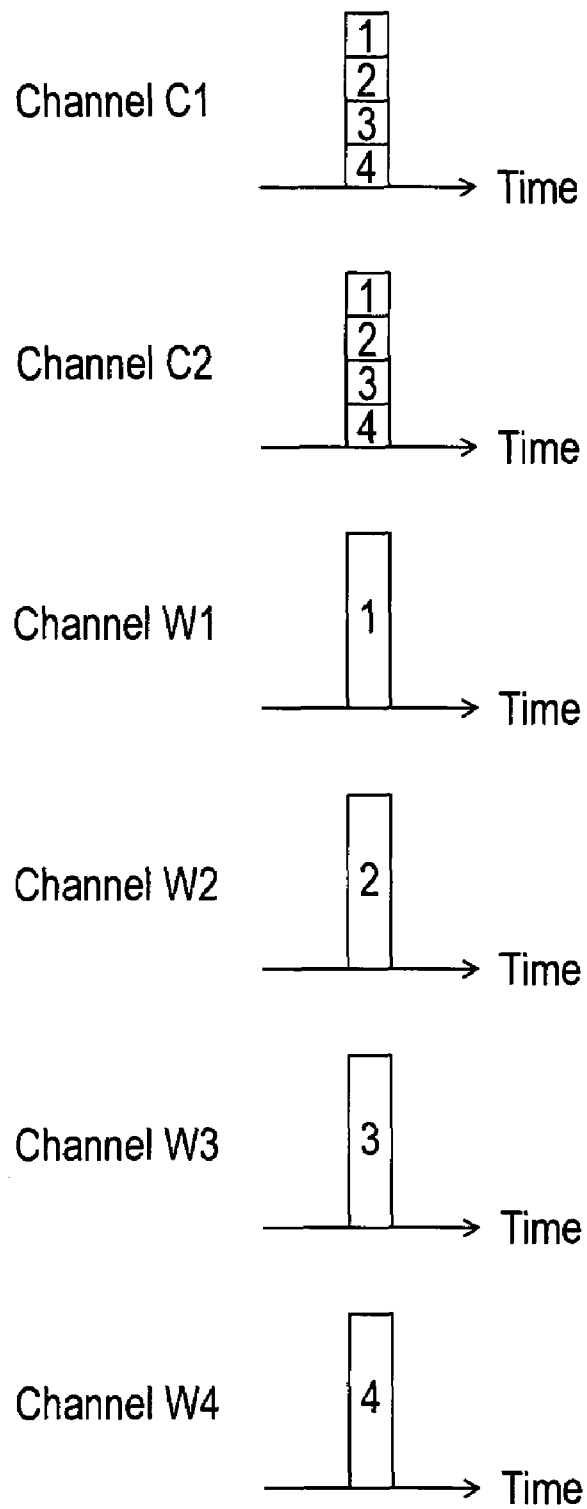
FIG. 8 are diagrams depicting time-based waveforms of the optical pulse at a point before encoding.

Now the transmission format of the optical signal in the optical multiplex communication system of the present invention will be described with reference to FIG. 8 to FIG. 11. FIG. 8 to FIG. 11 are diagrams depicting the time-based waveforms of optical pulse signals of 4 channels the WDM channels and the time-based waveforms of optical pulse signals of 2 channels of the OCDM channels, where the abscissa indicates the time base. FIG. 8 shows one optical pulse of the optical pulses constituting an optical pulse signal of each channel, that is channel C1 and channel C2 of the OCDM channels, and channel W1 to channel W4 of the WDM channels, in the sequence of top to bottom, aligning with the time base.

Figure 9:
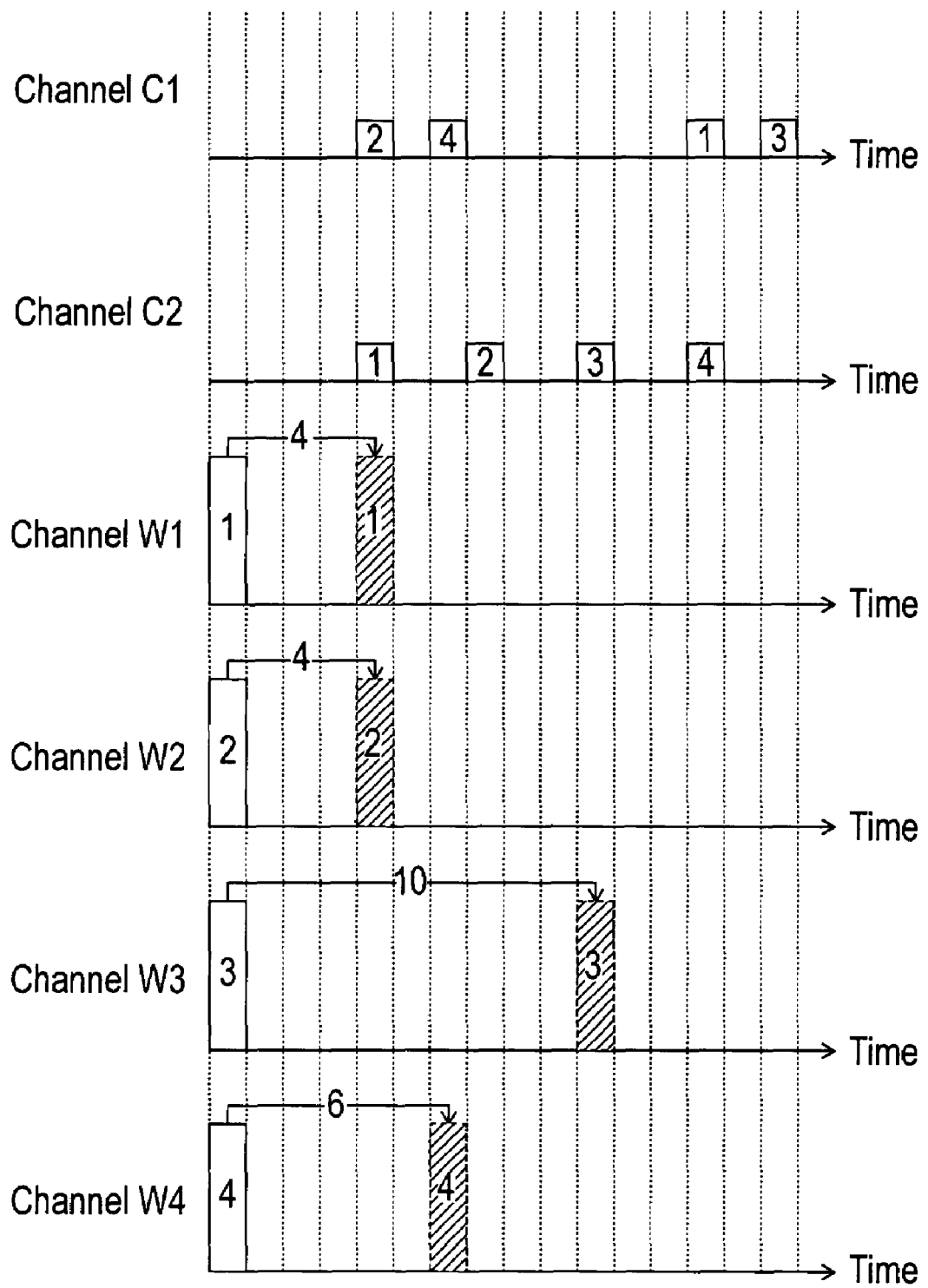
FIG. 9 are diagrams depicting time-based waveforms of the encoded optical pulse signal and wavelength-division optical pulse signal.
Figure 10:
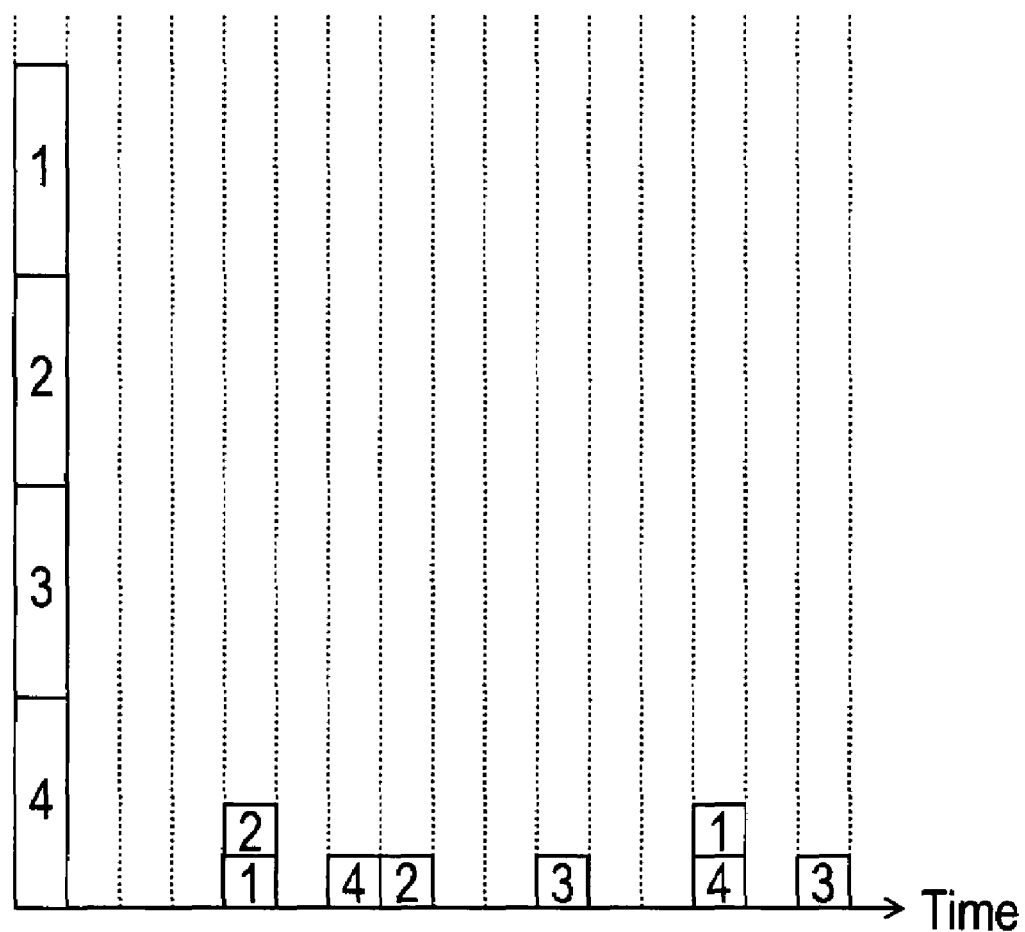
FIG. 10 is a diagram depicting time-based waveforms of the optical division multiplex signal.
Figure 11:
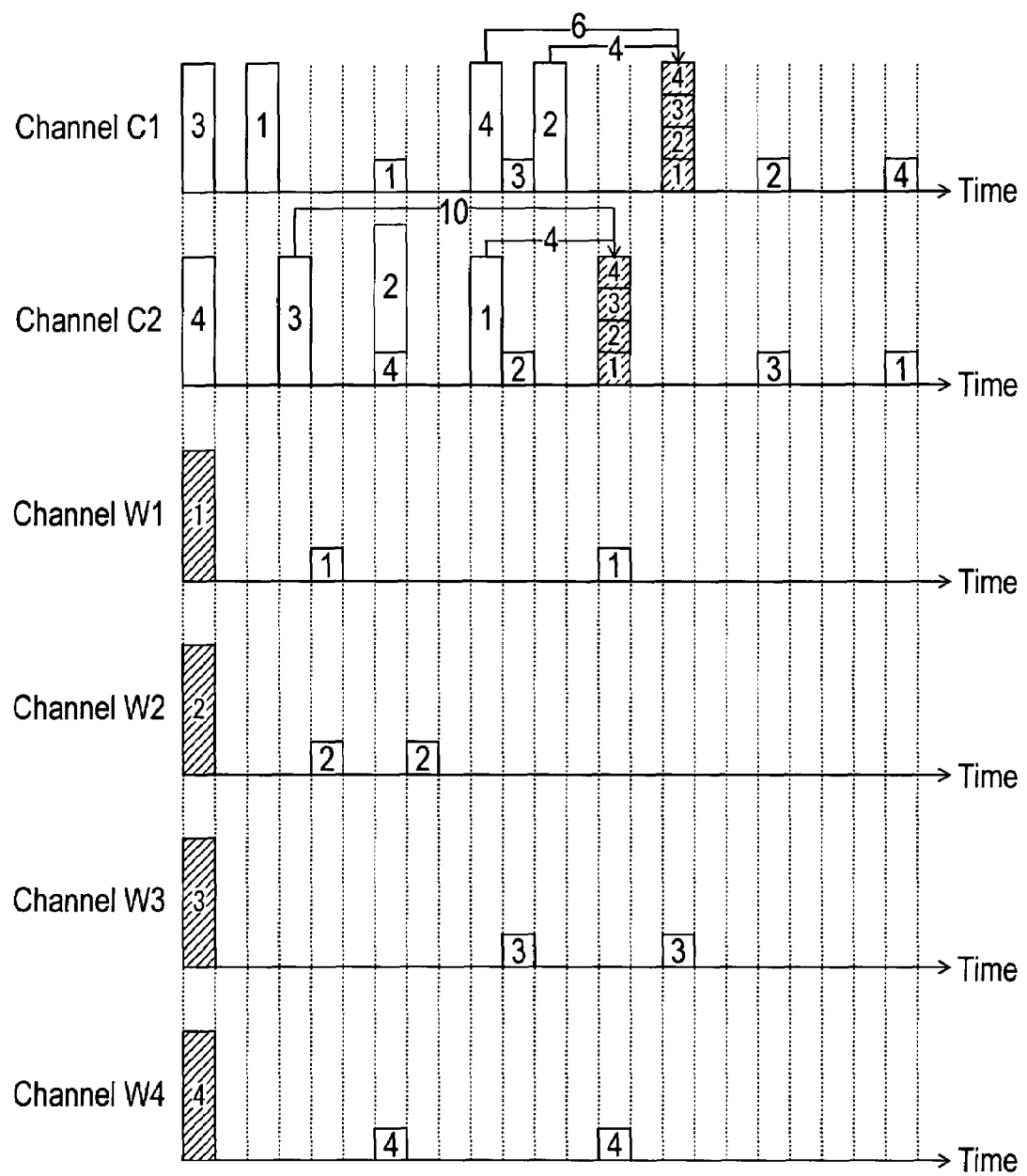
FIG. 11 are diagrams depicting time-based waveforms of the optical pulse signal of the decoded optical code division signal and the optical wavelength division channel.

In FIG. 9 to FIG. 11, the interval between the parallel vertical broken lines indicates a time slot of one optical pulse or chip pulse. In other words, one optical pulse or one chip pulse is distributed in this interval of broken lines. In this description, there are 4 channels of WDM channels and 2 channels of OCDM channels, but the number of channels is not limited to this, and the following description is valid regardless the number of channels.

In FIG. 8 to FIG. 11, the optical pulse constituting the optical pulse signal of the OCDM channel includes wavelengths $\lambda_1$, $\lambda_2$, $\lambda_3$ and $\lambda_4$, and the optical pulse signal of the WDM channel has a single wavelength $\lambda_1$, $\lambda_2$, $\lambda_3$ or $\lambda_4$, depending on the channel. To indicate this, a rectangle enclosing a number 1, 2, 3 or 4, which identifies wavelength $\lambda_1$, $\lambda_2$, $\lambda_3$ or $\lambda_4$, is stacked on a same point in time. In this description, it is assumed that an optical pulse signal is comprised of an optical pulse including four types of different wavelengths. However, the number of types of wavelengths included in an optical pulse is not limited to four, but the following description is valid regardless the number of types.

Just like FIGS. 2A to G, an optical pulse including different wavelength components is shown by a rectangle enclosing a number identifying a wavelength of the wavelength component stacked on a same point in time. An optical signal is a string of optical pulses reflecting a binary digital electric signal acquired after the optical pulse string is optically modulated and the electric pulse signal is converted into an optical pulse signal. However, if the transmission format of a single optical pulse is known, it is sufficient to describe the transmission format of one optical pulse to describe the transmission format of the optical pulse signal, since the same transmission format is used for all the optical pulses constituting the optical pulse signal. In the following description with reference to FIG. 8 to FIG. 11, this one optical pulse may be referred to as an optical pulse signal.

FIG. 8 are diagrams depicting the time-based waveforms of optical pulses at a point before encoding. In other words, one representative optical pulse constituting the optical pulse signal, which is output from the intensity modulator of an OCDM channel (e.g. intensity modulator 28 in the case of channel C1) and the intensity modulator of a WDM channel (e.g. intensity modulator 114 in the case of channel W1) in the transmission section 90, is shown respectively. For example, in FIG. 8, the optical pulse shown in channel C1 is one of the optical pulses constituting the optical pulse signal 29. The optical pulse shown in channel W1 is one of the optical pulses constituting the wavelength division optical pulse signal 115.

FIG. 9 are diagrams depicting the time-based waveforms of the encoded optical pulse signals of the wavelength division optical pulse signals. In other words, the diagrams shown as channel C1 and channel C2 show the time-based waveform of a chip pulse when a transmission optical pulse signal of channel C1 or channel C2 is encoded and converted into an encoded optical pulse signal, and then the optical pulse constituting this transmission optical pulse signal is encoded and generated as a chip pulse. The diagrams shown in channel W1 to channel W4 show the time-based waveforms of the optical pulse constituting the wavelength division optical pulse signal of each WDM channel. Therefore the diagrams shown as channel W1 to channel W4 show one optical pulse, and the optical pulses of channel W1 to channel W4 is comprised of a single wavelength $\lambda_1$, $\lambda_2$, $\lambda_3$ or $\lambda_4$. FIG. 9 includes a shaded rectangle as well, and the optical pulse indicated by this shaded rectangle by hatching is required to describe the operation of the later mentioned optical delay unit of the optical wavelength division channel section 86.

In FIG. 9, the positional relationship between chip pulses of channel C1 and channel C2, and the optical pulses of channel W1 to channel W4 on the time base is shown based on the following conditions for convenience of description. In other words, the positional relationship thereof is shown such that the position of an optical pulse of a WDM channel on the time base and a position of a chip pulse of an OCDM channel, which has a same wavelength as this optical pulse, on the time base, do not match.

As FIG. 9 shows, the array relationship of the chip pulses is different between channel C1 and channel C2, because the array relationship of these chip pulses on the time base is determined by the code being set for the encoder of each channel. In other words, the difference of the array relationship of the chip pulses is an identifier to distinguish channel C1 and channel C2.

In FIG. 9, the intensity of the optical pulse signal is the same for channel W1 to channel W4, but actually this intensity differs somewhat depending on the characteristic of the intensity modulator of each channel. The intensity of the chip pulse constituting the transformed encoded optical pulse signal is also somewhat different between channel C1 and channel C2, depending on the characteristic of the encoder of each channel.

FIG. 10 is a diagram depicting the time-based waveform of the optical division multiplex signal. In other words, FIG. 10 is a diagram to show the time-based waveform of the optical division multiplex signal 89 which is generated by the multiplexer 88 multiplexing the encoded optical pulse signal group 85 which is output from the OCDM channel section 84 and the wavelength division optical pulse signal group 87 which is output from the WDM channel 86. For each encoded optical pulse signal of the encoded optical pulse signal group 85, the intensities of the chip pulses constituting the encoded optical pulse signals of channel C1 and channel C2 are adjusted to be equal by the power adjustment unit of the OCDM channel section 84 (e.g. power adjustment unit 34 of channel C1). For each wavelength division optical pulse signal of the wavelength division optical pulse signal group 87, the intensities of the wavelength division optical pulse signals of channel W1 to channel W4 are adjusted to be equal by the power adjustment unit of the WDM channel section 86 (e.g. power adjustment unit 118 of channel W1).

The optical division multiplex signal 89 is a signal generated by multiplexing the encoded optical pulse signal group 85 and the wavelength division optical pulse signal group 87, so it is a signal when the respective time waveforms of the chip pulses constituting the encoded optical pulse signals of channel C1 and channel C2 and the optical pulse signals of the channel W1 to channel W4, shown in FIG. 9, are superimposed.

FIG. 11 are diagrams depicting the time-based waveforms of the decoded optical code division signal and the optical pulse signal of the optical wavelength division channel. In other words, FIG. 11 shows the time-based waveforms of the decoded OCDM receive signal 71 of channel C1, similar decoded OCDM receive signal of channel C2, WDM signal 109 of channel W1, and similar WDM signals of channel W2 to channel W4.

In FIG. 11, an optical pulse indicated by a shaded rectangle in the time-based waveform in each channel is an optical pulse constituting each regenerated receive signal. In other words, the optical pulse indicated by a shaded rectangle is a signal component to provide receive information which is received by the receive section 110, and the other optical pulses and chip pulses are noise components.

In the OCDM signal extraction section 96, only the optical pulses indicated by a shaded rectangle are extracted by the time gate processing. The time gate processing for extracting only signal components by the time gate processing will now be described using channel C1 as an example. The following description is also valid for channel C2.

The time-based waveform of the decoded OCDM receive signal 71, which is output from the decoder 70 of channel C1, is shown at the top of FIG. 11. In the time gate unit 72, where the electric clock signal 105 is supplied, the window of the time gate unit 72 opens only during the time slot, and becomes transmission state when the optical pulse indicated by a shaded rectangle exists on the time base. In a time slot other than a time slot when the optical pulse indicated by a shaded rectangle exists on the time base, the window of the time gate unit 72 is closed. Therefore only an optical pulse indicated by a shaded rectangle is output from the time gate unit 72, and other noise components are removed.

In the time waveform of channel C1 and channel C2 in FIG. 11, optical pulses of which intensity is equal to or higher than the optical pulse, which is a signal component to provide receive information indicated by a shaded rectangle, exist. These optical pulses are optical pulse components which come from the WDM channel, and are not optical pulses having receive information of channel C1 and channel C2. In other words, it is difficult to extract signal components to provide receive information depending on the threshold processing, because the optical pulse components which come from the WDM channel have an intensity equal to or higher than the intensity of the signal component to provide receive information, indicated by a shaded rectangle. Therefore in the OCDM signal extraction section 96, time gate processing is required as a means of extracting the signal components to provide the receive information.

Now a specific procedure of the time gate processing will be described with reference to FIG. 7. The time gate processing is performed by the time gate unit of the time gate processing control section 100 and the OCDM channel respectively. In the time gate processing control section 100, a part of the electric pulse signal 113, generated by converting the WDM signal 109 of channel W1 into an electric signal, is split, and a clock signal 103 is extracted from a part of this split electric pulse signal 113 by the clock signal extraction section 102. For the clock signal extraction method, which is executed by the clock signal extraction section 102, a known appropriate technology can be used.

The clock signal 103 is split into two by the second electric signal splitter 122, one is supplied to the delay unit 104 which generates a clock signal of which phase is adjusted and outputs it to channel C1, and the other is supplied to the delay unit 106 which generates a clock signal of which phase is adjusted and outputs it to channel C2. By the delay unit 104 and delay unit 106, the phases of the clock signals can be adjusted so that the position of the peak pulses of the auto-correlation waveform of channel C1 and channel C2 on the time base respectively and the positions of the electric pulses of the clock signals on the time base match. By this, the time gate unit can be operated so that the window of the time gate unit opens at a position of the optical pulse, indicated by the shaded rectangle of the OCDM channel on the time base shown in FIG. 11.

Generally the position of the peak pulse of the auto-correlation waveform of channel C1 and channel C2 on the time base is defined by the timing when the decoded OCDM receive signal reaches the respective time gate unit. In other words, this timing, that is the position of the peak pulse of the auto-correlation waveform of channel C1 and channel C2 on the time base is determined by the mutual phase relationship of the optical pulse strings 83-1 and 83-2 which are output from the splitter 82 of the transmission section 90, and the optical path from the intensity modulator to which each optical pulse string is input to the respective time gate unit in the receive section 110. Therefore it is reasonable to determine the time delay quantity to be set for the delay unit 104 and the delay unit 106 at the final adjustment stage of the optical multiplex communication system of the present invention. Specifically in the stage when the optical multiplex communication system is completed as a device, a pseudo-signal is sent by channel C1 and channel C2, and the time delay quantity of the delay unit 104 and delay unit 106 is adjusted and set so that the receive section can receive this pseudo-signal.

The delay unit for adjusting the phase of a clock signal must be set for each of the OCDM channels, and the same number of delay units as the OCDM channels are required. Here there are two OCDM channels, that is channel C1 and channel C2, so two delay units, delay unit 104 and delay unit 106, are required.

In the above description, the electric pulse signal 113 of channel W1 is used as the electric pulse signal for extracting the clock signal, but an electric pulse signal of any one of channel W2 to channel W4 may be used. The WDM channel for acquiring the electric pulse signal for extracting a clock signal (channel W1 in this case) must always be driven in the receive state.

In the WDM signal extraction section 98, on the other hand, threshold processing can be performed as a means of extracting a signal component to provide receive information. Now the extraction of the receive information in the WDM signal extraction section 98 will be described. In the following description, channel W1 is used as an example, but the following description is also valid for any one of channel W2 to channel W4.

For the channel W1 to channel W4 shown in FIG. 11, the time-based waveform of the optical signal immediately after being out from the wavelength demultiplexer 76 is shown. In other words, in the case of the channel W1, for example, the time-based waveform of the wavelength division multiplex signal 76-1 is shown. In the wavelength division multiplex signal 76-1, an optical signal which comes from the OCDM channel is mixed in via the multiplexer 88, transmission line 92, demultiplexer 101 and wavelength multiplexer 76. Unlike the above mentioned case of the OCDM channel, the intensity of the optical signal which comes from the OCDM channel, that is the noise components of the WDM channel, is lower than the intensity of the intensity of the optical pulses constituting the wavelength division multiplex signals 76-1 to 76-4 (optical pulses indicated by the shaded rectangles in channel W1 to channel W4 in FIG. 11).

Therefore in channel W1 to channel W4, only the optical pulse components of the WDM channel can be extracted by performing threshold judgment, that is, judging whether the peak value of the waveform is higher/lower than a threshold, which is higher than the intensity of a chip pulse which comes from the OCDM channel and lower than the intensity of an optical pulse constituting the wavelength division multiplex signals 76-1 to 76-4. If only the optical pulse having a wavelength assigned to each channel can be extracted in each WDM channel, the optical pulse is an optical pulse constituting the regenerated optical pulse signal of each WDM channel, so transmitted information can be received by converting this optical pulse signal extracted in each WDM channel into an electric signal.

Some configuration examples of the threshold judgment unit for performing this threshold processing are already known. Configuration examples of the threshold judgment unit will now be described.

<Threshold Judgment Unit>

As a first example of the threshold judgment unit, an example of the threshold judgment unit constructed using a non-linear optical fiber loop will be described. The configuration and operation principle of the non-linear optical fiber loop is described in (Govinda P. Agrawal: "Nonlinear Fiber Optics", Ver. 2, Academic Press, published 1989). Also an example of performing threshold processing using a non-linear optical fiber loop is disclosed in (Ju Han Lee, et al: "Reduction of Interchannel Interference Noise in a Two-Channel Grating-Based OCDMA System Using a Nonlinear Optical Loop Mirror", IEEE, Photonics Technology Letters, Vol. 13, No. 5, May 2001, pp. 529 to 531). Both examples use the phenomena in that the phase difference between the light which propagates the non-linear optical fiber loop clockwise and the light which propagates it counterclockwise depends on the intensity of the signal to be input to this non-linear optical fiber loop by the non-linear optical effect generated in the optical fiber constituting the non-linear optical fiber loop.

The light which is input to the non-linear optical fiber loop is split into a light which propagates the non-linear optical fiber loop clockwise, and a light which propagates it counterclockwise by the directional optical coupler. By setting this splitting ratio shifting from 1-to-1, the phase difference between the light which propagates the non-linear fiber loop clockwise and the light which propagates it counterclockwise can be dependent on the intensity of the input light non-linearly. By this, if the light which is input to the non-linear optical fiber loop is strong, the light can be output from the non-linear optical fiber loop as transmitted light, and if the light is weak, on the other hand, the light can be output as the reflected light.

The optical component to be removed as noise, of which intensity is weak, is output from the non-linear optical fiber loop as reflected light. The optical signal component, of which intensity is strong, is output from the non-linear optical fiber loop as transmitted light. Using this, only the optical signal components which are acquired as transmitted light can be extracted from the transmitted light output port of the non-linear optical fiber loop. In other words, the threshold processing can be executed for light which is input to the non-linear optical fiber loop.

The threshold judgment unit can also be constructed using a saturable absorber. The configuration and operation principle of a threshold judgment element constructed using a saturable absorber are described in detail in (Japanese Patent Application Laid-Open No. 2003-248251 (corresponding to US Patent Application Publication No. US 2005/0129382 A1)). According to this document, a carbon nano-tube is used as the saturable absorber. It is known that a carbon nano-tube has a non-linear optical characteristic where the absorbance thereof decreases in proportion to a square of the light intensity. Using this characteristic, operation similar to the above mentioned threshold judgment element, using a non-linear optical fiber loop, can be implemented.

In other words, if the light intensity to be input to the saturable absorber is strong, the saturable absorber becomes transparent, and outputs transmitted light. If the light intensity to be input to the saturable absorber is weak, the saturable absorber becomes opaque, and input light is blocked.

The optical component to be removed as noise, of which intensity is weak, is reflected by the saturable absorber. The optical signal component, of which intensity is strong, transmits through the saturable absorber and is output as transmitted light. Using this, only the optical signal components which can be acquired as transmitted light can be extracted from the transmitted light output port of the threshold judgment element formed by the saturable absorber. In other words, the threshold processing can be executed for the light which is input to the saturable absorber.

<Delay Quantity Setting Method for Optical Delay Unit>

As described above, according to the optical multiplex communication system of the present invention, the signal components to provide receive information of the respective channel can be extracted in the OCDM signal extraction section by time gate processing, or in the WDM signal extraction section by threshold processing. However, in the optical multiplex communication system which has the transmission/reception function based on OCDM and the transmission/reception function based on WDM in parallel, in some cases the signal component to provide receive information of the OCDM channel may not be extracted by the time gate processing in the OCDM signal extraction section. The handling in such a case will now be described.

In the above description with reference to FIG. 9, a condition imposed is that the position of the optical pulse of the WDM channel on the time base and the position of the chip pulse of the OCDM channel, of which wavelength is the same as this optical pulse, on the time base do not match. Therefore the optical pulse component which comes from the WDM channel is never superimposed on the positions of the optical pulses, indicated by shaded rectangles, of channel C1 and channel C2, as shown in FIG. 11 on the time base. As a consequence, the signal component to provide receive information of the OCDM channel can be extracted by performing time gate processing such that the window of the time gate unit opens in the positions of the optical pulses, indicted by shaded rectangles, on the time base.

However, as channel W1 in FIG. 9 shows, if the optical pulse, of which wavelength is $\lambda_1$, of channel W1 matches its position on the time base with that of the chip pulse, of which wavelength is $\lambda_1$, of channel C2, the following occurs. In other words, the position on the time base of the optical pulse of channel W1 is shifted 4 time slots from the case of the above description. This positional shift on the time base causes a shift in the optical pulse which comes from channel W1 of the WDM channel (unshaded rectangle to which the number "1" is assigned in channel C2 in FIG. 11) by 4 time slots on the time base, as the time-based waveform of channel C2 in FIG. 11 shows. Therefore, in the time-based waveform of channel C2 in FIG. 11, the peak of auto-correlation of channel C2 and the peak of the optical pulse which comes from W1 overlap on the time base. Also the intensity of this optical pulse is the same as the peak intensity of the auto-correlation waveform of channel C2. So it cannot be distinguished whether this pulse is the signal component to provide receive information of the OCDM channel or the optical pulse component which comes from the WDM channel.

In the same way, as channel W2 in FIG. 9 shows, if the position on the time base of the optical pulse, of which wavelength is $\lambda_2$, of channel W2 matches with that of the chip pulse, of which wavelength is $\lambda_2$, of channel C1, the optical pulse which comes from channel W2 of the WDM channel (unshaded rectangle to which the number "2" is assigned in channel C1 in FIG. 11) shifts by 4 time slots on the time base, as shown in the time waveform of channel C1 in FIG. 11. Therefore in the time-based waveform of channel C1 in FIG. 11, the peak of the auto-correlation of channel C1 and the peak of the optical pulse which comes from channel W2 overlap on the time base. Also the intensity of this optical pulse is the same as the peak intensity of the auto-correlation waveform of channel C1, so it cannot be distinguished whether this pulse is the signal component to provide the receive information of the OCDM channel or the optical pulse component which comes from the WDM channel depending on the time gate processing.

In FIG. 9, if the position on the time base of the optical pulse, of which wavelength is $\lambda_3$, of channel W3 matches with that of the chip pulse, of which wavelength is $\lambda_3$, of channel C2, the optical pulse which comes from channel W3 (unshaded rectangle of C2 to which the number "3" is assigned in FIG. 11) shifts by 10 time slots on the time base, as shown in the time-based waveform of channel C2 in FIG. 11. Therefore in the time-based waveform of channel C2 in FIG. 11, the peak of channel C2 and the peak of the optical pulse which comes from channel W3 overlap on the time base. Also the intensity of this optical pulse is the same as the peak intensity of the auto-correlation waveform of channel C2, so it cannot be distinguished whether this pulse is the signal component to provide the receive information of the OCDM channel or the optical pulse component which comes from the WDM channel depending on the time gate processing.

In the same way, if the position on the time base of the optical pulse, of which wavelength is $\lambda_4$, of channel W4 matches with that of the chip pulse, of which wavelength is $\lambda_4$, of channel C1, the optical pulse which comes from channel W4 (unshaded rectangle to which the number "4" is assigned in C2 in FIG. 11) shifts by 6 time slots on the time base, as shown in the time-based waveform of channel C1 in FIG. 11. Therefore in the time-based waveform of channel C1 in FIG. 11, the peak of channel C1 and the peak of the optical pulse which comes from channel W4 overlap on the time base. Also the intensity of this optical pulse is the same as the peak intensity of the auto-correlation waveform of channel C1, so it cannot be distinguished whether this pulse is the signal component to provide the receive information of the OCDM channel or the optical pulse component which comes from the WDM channel.

Therefore the WDM channel section 86 must add the time delay required for not matching the position of the optical pulse constituting the wavelength division optical pulse signal 119 on the time base and the position of the chip pulse constituting the encoded optical pulse signal 35, of which wavelength is the same as this optical pulse, on the time base, to the wavelength division optical pulse signal of each channel constituting the WDM channel, using the optical delay unit of the WDM channel section 86.

The delay quantity to be set for the optical delay unit of each of the wavelength division channels is determined by the delay quantity adjustment method which includes the following steps.

(1) A first step of generating a test optical pulse string including mutually different wavelength components which are at least the same number as the number of channels, constructed by test optical pulses arrayed on a time axis at an equal interval and dividing this test optical pulse string into a first test optical pulse string and a second test optical pulse string, (2) a second step of inputting the first test optical pulse string and the second test optical pulse string to the optical code division channel section and the optical wavelength division channel section respectively, (3) a third step of outputting the second test optical pulse string from the optical wavelength division channel section, while encoding the first test optical pulse string in the optical code division channel section, and outputting it as an encoded test optical pulse string, and (4) a fourth step of adjusting the delay quantity sequentially for all the optical delay units arranged in the optical wavelength division channel, for each optical delay unit arranged for each of the optical wavelength division channels, according to the following procedures (a) and (b).

(a) While observing the encoded test optical pulse string filtered by a band pass filter for transmitting a wavelength assigned to an optical wavelength division channel where the optical delay unit is installed, and a test optical pulse string of the optical wavelength division channel to which the wavelength is assigned, simultaneously as a time waveform, and (b) setting a time delay quantity so that a chip pulse constituting the encoded test optical pulse string, and an optical pulse constituting a test optical pulse string of an optical wavelength division channel to which the wavelength, which is the same wavelength as the chip pulse, is assigned, do not match on the time base.

Figure 12:
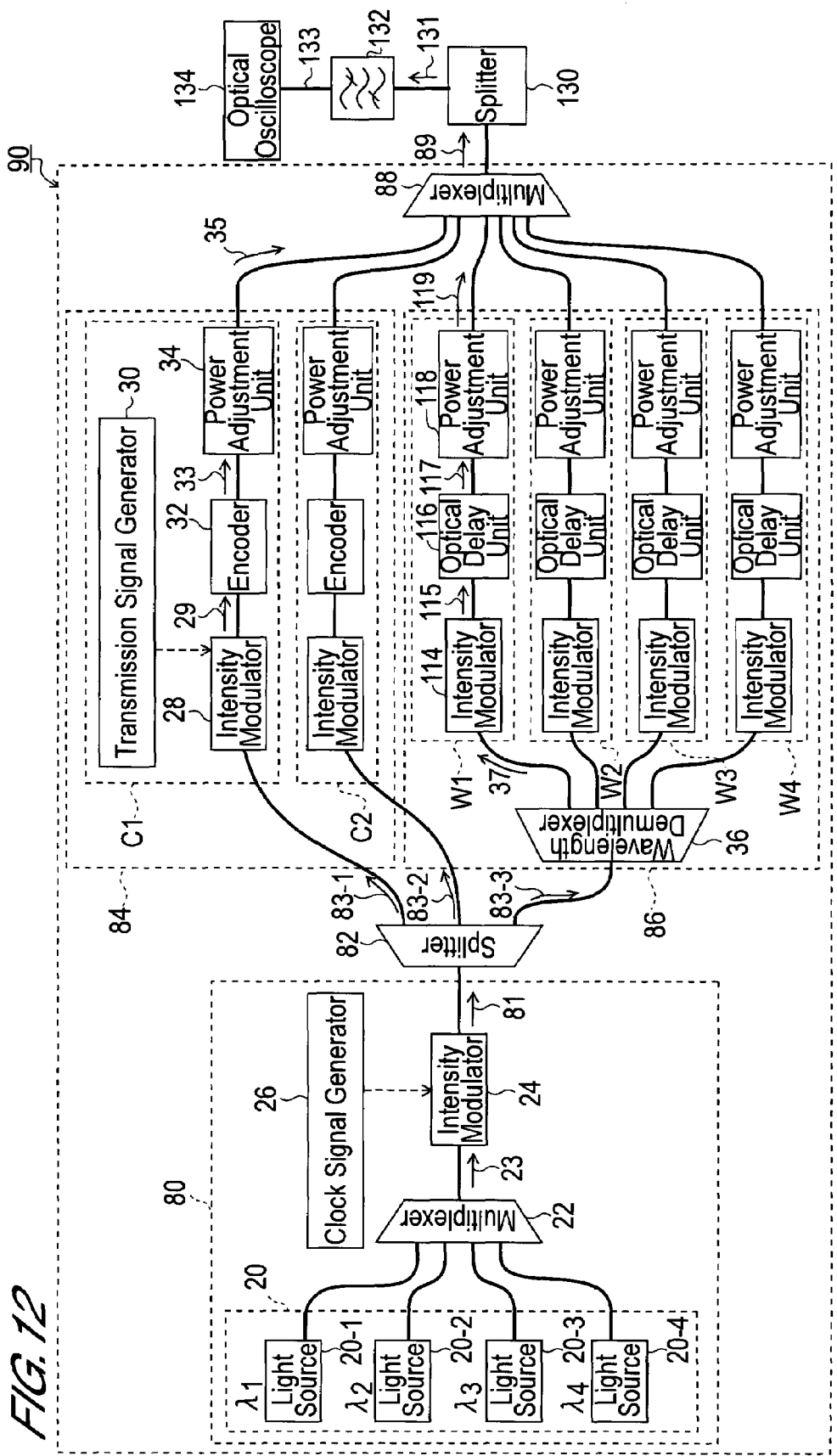
FIG. 12 is a diagram for explaining the method for setting the delay quantity of the optical delay unit.

The method for adjusting the delay quantity to be set for the optical delay unit which is installed in each of the wavelength division channels will now be described with specifics, with reference to FIG. 12. FIG. 12 is a diagram for explaining the method for setting a delay quantity of the optical delay unit. To execute the method for adjusting the delay quantity to be set for the delay unit, a splitter 130, an optical band pass filter 132 and an optical oscilloscope 134 are attached to the output stage of the multiplexer 88 of the transmission section 90, as shown in FIG. 12.

In the case of adjusting the delay quantity to be set for the optical delay unit, it is preferable to adjust the delay quantity while not supplying a transmission signal of each channel to an intensity modulator of each of the OCDM channel and WDM channel. In other words, an encoded pulse string which is an optical pulse string simply encoded is output from the power adjustment unit of the OCDM channel, and an optical pulse string including only the wavelength assigned to each channel is output from the power adjustment unit of the WDM channel, and the test optical division multiple signal which does not include transmission information to be output from the multiplexer 88 of the transmission section 90 is split by the splitter 130, and is extracted as the test optical division multiplex signal 131.

Now each step of the method for adjusting the delay quantity to be set for the optical delay unit of each of the wavelength division channels will be sequentially described assuming the case when the delay quantity adjustment method is applied to the optical multiplex communication system of the above mentioned embodiment.

In the optical multiplex communication system of the above mentioned embodiment, there are a total of four WDM channels, so the first test optical pulse string and the second test optical pulse string, which include four types of mutually different wavelength components, are generated. It is for certain acceptable to generate the first test optical pulse string and the second test optical pulse string including five or more types of mutually different wavelength components, but it is preferable to generate specific optical pulse strings to be used for the optical multiplex communication system as the first test optical pulse string and the second test optical pulse string. This step can be executed by the optical pulse string generation section 80 and the splitter 82.

In this case, the WDM channel section 86 is comprised of 4 channels, so a test optical pulse string including four types of mutually different wavelengths, wavelengths $\lambda_1, \lambda_2, \lambda_3$ and $\lambda_4$, which are arrayed on a time base with an equal interval, are generated by the optical pulse string generation section 80. As described with reference to FIG. 6, this test optical pulse string is generated by the light source group 20 comprised of the light sources 20-1, 20-2, 20-3 and 20-4, which generates continuous wave lights having mutually different wavelengths $\lambda_1, \lambda_2, \lambda_3$ and $\lambda_4$, the intensity modulator 24 and the clock signal generator 26.

Then the second step of inputting the test optical pulse strings 83-1 and 83-2 and the test optical pulse string 83-3 to the OCDM channel section 84 and the WDM channel section 86 respectively is executed.

The test optical pulse string which is output from the intensity modulator 24 is input to the splitter 82, split into the test optical pulse strings 83-1, 83-2 and 83-3, which are input to the wavelength demultiplexers 36 of channel C1, channel C2 and WDM channel section 86 respectively. In this case, the test optical pulse strings 83-1 and 83-2 correspond to the first test optical pulse string, and the test optical pulse string 83-3 corresponds to the second test optical pulse string. Here the first test optical pulse string and the second test optical pulse string may be referred to as the test optical pulse strings 83-1, 83-2 and 83-3 instead, according to the optical multiplex communication system of the embodiment for executing this delay quantity adjustment method.

Then the third step of outputting the test optical pulse string 83-3 from the WDM channel section 86 is executed while encoding the test optical pulse strings 83-1 and 83-2 respectively in channel C1 and channel C2 of the OCDM channel section 84, and outputting them as an encoded test optical pulse strings. During the execution of the delay quantity adjustment method of the present invention, the test optical pulse string 83-3, which is input to the WDM channel section 86, is directly output from the WDM channel section 86 without performing intensity modulation, so the second test optical pulse string to be output from the WDM channel section 86 is the same as the test optical pulse string 83-3 which was input, only power adjustment has been performed. It is preferable to also perform power adjustment for the encoded test optical pulse strings, which are the test optical power strings 83-1 and 83-2 to be output from the OCDM channel section 84 encoded.

Here the encoded test optical pulse strings, which are the test optical pulse strings 83-1 and 83-2 encoded, and the test optical pulse string 83-3, are multiplexed by the multiplexer 88, and the test optical division multiplex signal, which does not include transmission information, is output. This test optical division multiplex signal is split by the splitter 130, and extracted as the test optical division multiplex signal 131.

Then the fourth step is executed. Here the test optical division multiplex signal 131 is filtered by an optical band pass filter 132, which selectively transmits only wavelength $\lambda_1$ assigned to channel W1, and is output as the test optical division multiplex signal 133 including only the components of wavelength $\lambda_1$, which is observed by an optical oscilloscope 134. In the optical oscilloscope 134, only the chip components of which wavelength is $\lambda_1$ are observed, out of the chip pulses of the encoded test optical pulse strings which are the test optical pulse strings 83-1 and 83-2 encoded. At the same time, the optical pulse string comprised of only wavelength components of wavelength $\lambda_1$, assigned to channel W1, are observed.

The optical pulse string comprised only of the wavelength components of wavelength $\lambda_1$, assigned to channel W1, changes the position thereof on the time base according to the time delay quantity which is set for the optical delay unit 116 installed in channel W1. Therefore while changing the time delay quantity to be set for the optical delay unit 116, a time delay quantity which satisfies the condition that the optical pulse with wavelength $\lambda_1$ does not overlap with any chip pulses of the chip components of which wavelength is $\lambda_1$, out of the chip pulses of the encoded test optical pulse strings which are the test optical pulse strings 83-1 and 83-2 encoded, is selected. It is easy to distinguish the optical pulse with wavelength $\lambda_1$, which is observed by the optical oscilloscope 134 from the chip pulse of the encoded test optical pulse strings which are the test optical pulse strings 83-1 and 83-2 encoded, since the optical pulse with wavelength $\lambda_1$ shifts on the time base when the time delay quantity to be set in the optical delay unit 116 is changed.

The method for setting the time delay quantity to be set for the optical delay unit 116 of channel W1 was described above, but this setting can be sequentially performed for any of the channels of channel W2 to channel W4 in the same manner. In other words, in order to distinguish the time delay quantity to be set for the respective optical delay unit of channel W2 to channel W4, the transmission wavelength of the optical band pass filter 132 is sequentially changed from $\lambda_2$ to $\lambda_4$ respectively.

When the time delay quantity to be set for the respective optical delay unit of channel W1 to channel W4 is determined, the fourth step ends. When the first step to the fourth step end, the optical multiplex communication system, where the time delay required for not matching the position of the optical pulse constituting the wavelength division optical pulse signal of the WDM channel on the time base and the position of the chip pulse constituting the encoded optical pulse signal of which wavelength is the same as this optical pulse, is set in the optical delay unit of each WDM channel, is completed.

What is claimed is:

1. An optical multiplex communication system, comprising:

an optical code division channel section for encoding an optical pulse signal of an optical code division channel by an encoder and generating an encoded optical pulse signal, and an optical wavelength division channel section for generating a wavelength division optical pulse signal, both being provided at a transmission side in parallel; and an optical code division multiplex signal extraction section having a decoder to generate a decoded optical code division signal, and an optical wavelength division multiplex signal extraction section having a wavelength demultiplexer for extracting optical pulse signal components of a plurality of optical wavelength division channels, both being provided at a receive side in parallel, wherein said optical wavelength division channel section has an optical delay unit for each of said plurality of optical wavelength division channels, so as to provide, to said optical pulse, time delay required for not matching a position of an optical pulse constituting said wavelength division optical pulse signal on a time base, and a position of a chip pulse constituting said encoded optical pulse signal which has a same wavelength as said optical pulse on the time base.

2. An optical multiplex communication system, comprising:

a transmission section comprising,
 an optical code division channel section for assigning mutually different time-spread/wavelength-hop codes to a plurality of optical code division channels, and generating an encoded optical pulse signal by encoding an optical pulse signal of each optical code division channel using an encoder, and
 an optical wavelength division channel section for assigning mutually different wavelengths to a plurality of optical wavelength division channels and generating a wavelength division optical pulse signal, both being provided in parallel,
 the transmission section further comprising a multiplexer for generating an optical division multiplex signal by multiplexing said encoded optical pulse signal and said wavelength division optical pulse signal; and a receive section comprising,
 a demultiplexer for separating said optical division multiplex signal into an optical code division multiplex receive signal and an optical wavelength division multiplex receive signal,
 an optical code division multiplex signal extraction section comprising a decoder for generating a decoded optical code division signal by decoding said optical code division multiplex receive signal for each of said optical code division channels using a same code as said time-spread/wavelength-hop code, and a time gate processing control section for extracting only auto-correlation waveform components of said optical pulse signal from said decoded optical code division signal, adjusting a delay quantity of a clock signal for time gate processing to regenerate the optical pulse signal of the optical code division channel, and supplying the signal to a time gate unit, and
 an optical wavelength division multiplex signal extraction section, comprising a wavelength demultiplexer for performing wavelength division on said optical wavelength division multiplex receive signal and extracting optical pulse signal components of each of said plurality of optical wavelength division channels, a threshold judgment unit for performing threshold judgment on optical pulse signal components of each of said plurality of optical wavelength division channels and regenerating an optical pulse signal of each of said plurality of optical wavelength division channels, and a clock signal extraction section for extracting said clock signal from optical pulse signal components of one of said optical wavelength division channels and supplying the signal to said time gate processing control section, the optical code division multiplex signal extraction section and the optical wavelength division multiplex signal extraction section being provided in parallel, wherein said optical wavelength division channel section has an optical delay unit for each of said optical wavelength division channels, so as to provide, to said optical pulse, time delay required for not matching a position of an optical pulse constituting said wavelength division optical pulse signal on a time base and a position of a chip pulse constituting said encoded optical pulse signal which has a same wavelength as said optical pulse on the time base.

3. The optical multiplex communication system according to claim 1, wherein said encoder comprises a fiber Bragg grating.

4. The optical multiplex communication system according to claim 2, wherein said encoder comprises a fiber Bragg grating.

5. The optical multiplex communication system according to claim 1, wherein said decoder comprises a fiber Bragg grating.

6. The optical multiplex communication system according to claim 2, wherein said decoder comprises a fiber Bragg grating.

7. The optical multiplex communication system according to claim 2, wherein said threshold judgment unit comprises a non-linear fiber loop.

8. The optical multiplex communication system according to claim 2, wherein said threshold judgment unit comprises a saturable absorber.

9. The optical multiplex communication system according to claim 2, wherein said time gate processing control section comprises a clock signal extraction section and an electron-absorption modulator.

10. A delay quantity adjustment method for adjusting the time delay quantity of the optical pulse in the optical multiplex communication system according to claim 1, comprising the steps of:

generating a test optical pulse string that includes mutually different wavelength components which are at least the same number as the number of channels, and that is constructed by test optical pulses arrayed on a time base with an equal interval, and dividing said test optical pulse string into a first test optical pulse string and a second test optical pulse string;

inputting said first test optical pulse string and said second test optical pulse string to said optical code division channel section and said optical wavelength division channel section respectively;

outputting said second test optical pulse string from said optical wavelength division channel section, while encoding said first test optical pulse string in said optical code division channel section and outputting the pulse string as an encoded test optical pulse string; and adjusting delay quantity sequentially for all the optical delay units arranged in said optical wavelength division channels, for each of said optical delay units arranged for each of said optical wavelength division channels, according to the following procedures (a) and (b), (a) while observing said encoded test optical pulse string filtered by a band pass filter for transmitting a wavelength assigned to the optical wavelength division channel where said optical delay unit is arranged, and a test optical pulse string of the optical wavelength division channel to which said wavelength is assigned, simultaneously as time waveforms, and (b) setting a time delay quantity so that a chip pulse constituting said encoded test optical pulse string, and an optical pulse constituting the test optical pulse string of the optical wavelength division channel to which said wavelength, which is a same wavelength as said chip pulse, is assigned, do not match on a time base.

11. A delay quantity adjustment method for adjusting the time delay quantity of the optical pulse in the optical multiplex communication system according to claim 2, comprising the steps of:

generating a test optical pulse string that includes mutually different wavelength components which are at least the same number as the number of channels, and that is constructed by test optical pulses arrayed on a time base with an equal interval, and dividing said test optical pulse string into a first test optical pulse string and a second test optical pulse string;

inputting said first test optical pulse string and said second test optical pulse string to said optical code division channel section and said optical wavelength division channel section respectively;

outputting said second test optical pulse string from said optical wavelength division channel section, while encoding said first test optical pulse string in said optical code division channel section and outputting the pulse string as an encoded test optical pulse string; and adjusting delay quantity sequentially for all the optical delay units arranged in said optical wavelength division channels, for each of said optical delay units arranged for each of said optical wavelength division channels, according to the following procedures (a) and (b), (a) while observing said encoded test optical pulse string filtered by a band pass filter for transmitting a wavelength assigned to the optical wavelength division channel where said optical delay unit is arranged, and a test optical pulse string of the optical wavelength division channel to which said wavelength is assigned, simultaneously as time waveforms, and (b) setting a time delay quantity so that a chip pulse constituting said encoded test optical pulse string, and an optical pulse constituting the test optical pulse string of the optical wavelength division channel to which said wavelength, which is a same wavelength as said chip pulse, is assigned, do not match on a time base.

* * * * *